(12) United States Patent
Deutsch et al.

(10) Patent No.: US 8,118,057 B2
(45) Date of Patent: Feb. 21, 2012

(54) TEMPERATURE ROTATIONAL LIMIT STOP FOR A MIXING VALVE

(75) Inventors: Mark Alan Deutsch, Haubstadt, IN (US); Cameron Danté Martin, Morgantown, KY (US)

(73) Assignee: Masco Corporation of Indiana, Indianapolis, IN (US)

( * ) Notice: Subject to any disclaimer, the term of this patent is extended or adjusted under 35 U.S.C. 154(b) by 1153 days.

(21) Appl. No.: 11/977,467

(22) Filed: Oct. 25, 2007

(65) Prior Publication Data

US 2009/0108223 A1      Apr. 30, 2009

(51) Int. Cl.
*F16K 11/06* (2006.01)
(52) U.S. Cl. .................. 137/625.4; 251/285; 251/288
(58) Field of Classification Search ............ 137/625.4; 251/284, 285, 286, 288
See application file for complete search history.

(56) References Cited

U.S. PATENT DOCUMENTS

| | | | |
|---|---|---|---|
| 3,831,621 A * | 8/1974 | Anthony et al. ............ 137/270 |
| 4,089,347 A | 5/1978 | Christo |
| 4,105,043 A * | 8/1978 | Nicolayczik ............. 137/454.2 |
| 4,387,880 A * | 6/1983 | Saarisalo et al. ............ 251/285 |
| 4,397,330 A * | 8/1983 | Hayman ................. 137/270 |
| 4,423,752 A | 1/1984 | Psarouthakis |
| 4,981,156 A | 1/1991 | Nicklas et al. |
| 5,010,917 A * | 4/1991 | Iqbal ..................... 137/454.6 |
| 5,095,934 A | 3/1992 | Iqbal |
| 5,326,075 A * | 7/1994 | Goff ....................... 251/285 |
| 5,341,845 A | 8/1994 | Graber |
| 5,355,906 A | 10/1994 | Marty et al. |
| 5,398,717 A * | 3/1995 | Goncze .................... 137/270 |
| 5,477,885 A | 12/1995 | Knapp |
| 5,615,709 A | 4/1997 | Knapp |
| 5,725,010 A | 3/1998 | Marty et al. |
| 5,927,333 A | 7/1999 | Grassberger |
| 5,931,181 A | 8/1999 | Cook et al. |
| 5,967,184 A | 10/1999 | Chang |
| 6,016,830 A * | 1/2000 | Niakan et al. ............. 137/270 |
| 6,123,105 A * | 9/2000 | Yang .................... 137/625.41 |
| 6,170,523 B1 | 1/2001 | Chang |
| 6,293,299 B1 | 9/2001 | Nelson |
| 6,325,089 B1 | 12/2001 | Breda |
| 6,390,128 B1 | 5/2002 | Tung |
| 7,007,717 B2 * | 3/2006 | Lin ..................... 137/625.41 |
| 7,137,410 B2 | 11/2006 | Rosko |
| 7,823,603 B2 * | 11/2010 | Cochart et al. ........ 137/625.41 |
| 2006/0231140 A1 | 10/2006 | McNerney |
| 2007/0056639 A1 | 3/2007 | McNerney |
| 2008/0023085 A1 | 1/2008 | Rosko et al. |

OTHER PUBLICATIONS

Drawing of known rotational limit stop, Sep. 12, 2006, 1 pg.
DELTA Models 1300 & 1400 Single Handle Monitor® Pressure Balanced Bath Valves, 39567 Rev., Oct. 11, 2002, 4 sheets.
DELTA Model 14442 Single Handle Monitor® Pressure Balanced Bath Valves, 43144 Rev. A, Aug. 13, 2004, 4 sheets.
DELTA 48312 Installation Instructions, Mar. 7, 2007, 2 pgs.
DELTA MultiChoice™ Valve Trim Installation Instructions, Owner's Manual, 13/14, 17 & 17T Series, Rev. C, Mar. 7, 2007, 34 pgs.

* cited by examiner

*Primary Examiner* — John Fox
(74) *Attorney, Agent, or Firm* — Faegre Baker Daniels LLP

(57) ABSTRACT

A temperature limit stop assembly for a mixing valve including a stop surface supported by a stem and a hot water stop shoulder supported by a stop member and engagable with the stop surface of the stem to limit rotational movement of a valve plate.

21 Claims, 28 Drawing Sheets

TEMPERATURE ROTATIONAL LIMIT STOP FOR A MIXING VALVE

BACKGROUND AND SUMMARY OF THE INVENTION

The present invention relates generally to mixing valves for use with fluid delivery devices and, more particularly, to temperature rotational limit stops for mixing valves.

Single handle mixing valves are often used in connection with fluid delivery devices, such as tub spouts and shower heads. Rotation of the handle typically causes operation of the valve cartridge to control the relative proportion of water from hot and cold water supply ports to an outlet port. Prior mixing valves often include a built-in pressure balance mechanism to prevent rapid changes of water temperature in response to either a hot water supply or cold water supply pressure drop.

Prior art mixing valves may also include a temperature rotational limit stop that is configured to prevent counter-clockwise rotation of the handle past a certain orientation and thereby limit the proportional flow of hot water and the resulting temperature of water delivered to the outlet port. Such rotational limit stops may be adjustable such that an end user may modify the desired maximum water temperature delivered to the outlet port. In many instances, such prior art rotational limit stops include a retainer disk that is required to be removed and reinstalled after the limit stop has been angularly positioned in the desired setting.

According to an illustrative embodiment of the present disclosure, a mixing valve includes a housing having an outlet port, a cold water supply port, and a hot water supply port. A cap is supported by the housing. A valve plate includes a first control opening in selective fluid communication with the cold water supply port, and a second control opening in selective fluid communication with the hot water supply port. The valve plate is supported for rotation relative to the cap. A stem is operably coupled to the valve plate, wherein rotation of the stem causes rotation of the valve plate and simultaneous movement of the first control opening and the second control opening to determine the amount of fluid communication with the cold water supply port and the hot water supply port for controlling the flow rate and the temperature of water provided to the outlet port. A stop surface is supported by the stem. A stop member includes a hot water stop shoulder engagable with the stop surface of the stem to limit rotational movement of the valve plate, and an engagement surface extending substantially perpendicular to the stem. A handle includes a retaining surface and is operably coupled to the stem such that the retaining surface is engagable with the engagement surface of the stop member to restrict axial movement thereof. A retainer is coupled to the cap and is configured to cooperate with the stop member to limit axial movement of the stop member relative to the cap in the absence of the handle, while permitting selective rotational movement of the stop member relative to the cap.

According to a further illustrative embodiment of the present disclosure, a mixing valve includes a stem defining a longitudinal axis, a stop surface supported by the stem, and a cap receiving the stem and having a plurality of splines. A stop member includes a plurality of splines and a hot water stop shoulder. The plurality of splines of the stop member are configured to selectively engage the plurality of splines of the cap. The hot water stop shoulder is engagable with the stop surface of the stem to limit rotational movement of the stem. A handle is operably coupled to the stem. A retainer is operably coupled to the cap and includes a plurality of biasing members configured to bias the stop member in an axial direction away from the handle and toward the cap for facilitating engagement between the splines of the stop member and the splines of the cap.

According to another illustrative embodiment of the present disclosure, a temperature limit stop assembly for a mixing valve includes a cap having a cylindrical sidewall and a plurality of splines extending radially inwardly from the sidewall. A stop member is concentrically received within the cap and includes a base, a sidewall extending upwardly from the base, a stop shoulder supported by the sidewall, and a plurality of splines extending radially outwardly from the base, the splines of the stop member being configured to selectively engage the splines of the cap. A retainer is supported by the cap and is configured to limit axial movement of the stop member. The sidewall of the stop member extends above the retainer, and the base of the stop member is positioned within a chamber defined by the cap and the retainer in both a set mode of operation and an adjust mode of operation. The set mode of operation is defined when the splines of the stop member are engaged with the splines of the cap, and the adjust mode of operation is defined when the stop member is axially displaced from the cap such that the splines of the stop member are disengaged from the splines of the cap and the stop member is rotatable.

According to a further illustrative embodiment of the present disclosure, a mixing valve includes a stem defining a longitudinal axis, a stop surface supported by the stem, a cap receiving the stem and including a plurality of splines, and a stop member including an annular adjustment ring having a plurality of splines and supporting a hot water stop shoulder. The stop member further includes an engagement surface extending substantially perpendicular to the stem and a standoff supporting the engagement surface in axially spaced relation to the adjustment ring. The plurality of splines of the stop member are configured to selectively engage the plurality of splines of the cap. The hot water stop shoulder is engagable with the stop surface of the stem to limit rotational movement of the stem. A handle is operably coupled to the stem and includes a retaining surface, wherein the engagement surface of the stop member is engagable with the retaining surface of the handle.

According to yet another illustrative embodiment of the present disclosure, a mixing valve includes a housing having an outlet port, a cold water supply port, and a hot water supply port, a cap supported by the housing, a valve plate including a first control opening in selective fluid communication with the cold water supply port, and a second control opening in selective fluid communication with the hot water supply port. The valve plate is supported for rotation relative to the cap. A stem is operably coupled to the valve plate and defines a longitudinal axis. A stop actuator is supported by the stem and includes a stop surface, the stop actuator being configured to move axially along the stem between a first retained position and a second retained position, the first retained position closer to the cap than the second retained position. A stop member is supported by the cap and includes a hot water stop shoulder engagable with the stop surface of the stop actuator to limit rotational movement of the valve plate, wherein the stop member is rotationally adjustable relative to the cap when the stop actuator is in the second retained position.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. While the disclosure is described in connection with water, it should be understood that additional types of fluids may be used. Additionally, while the mixing valve disclosed herein is shown for use with fluid delivery devices associated with a shower, it should be appreciated that it may be incorporated for use with other fluid delivery devices.

Figure 1:
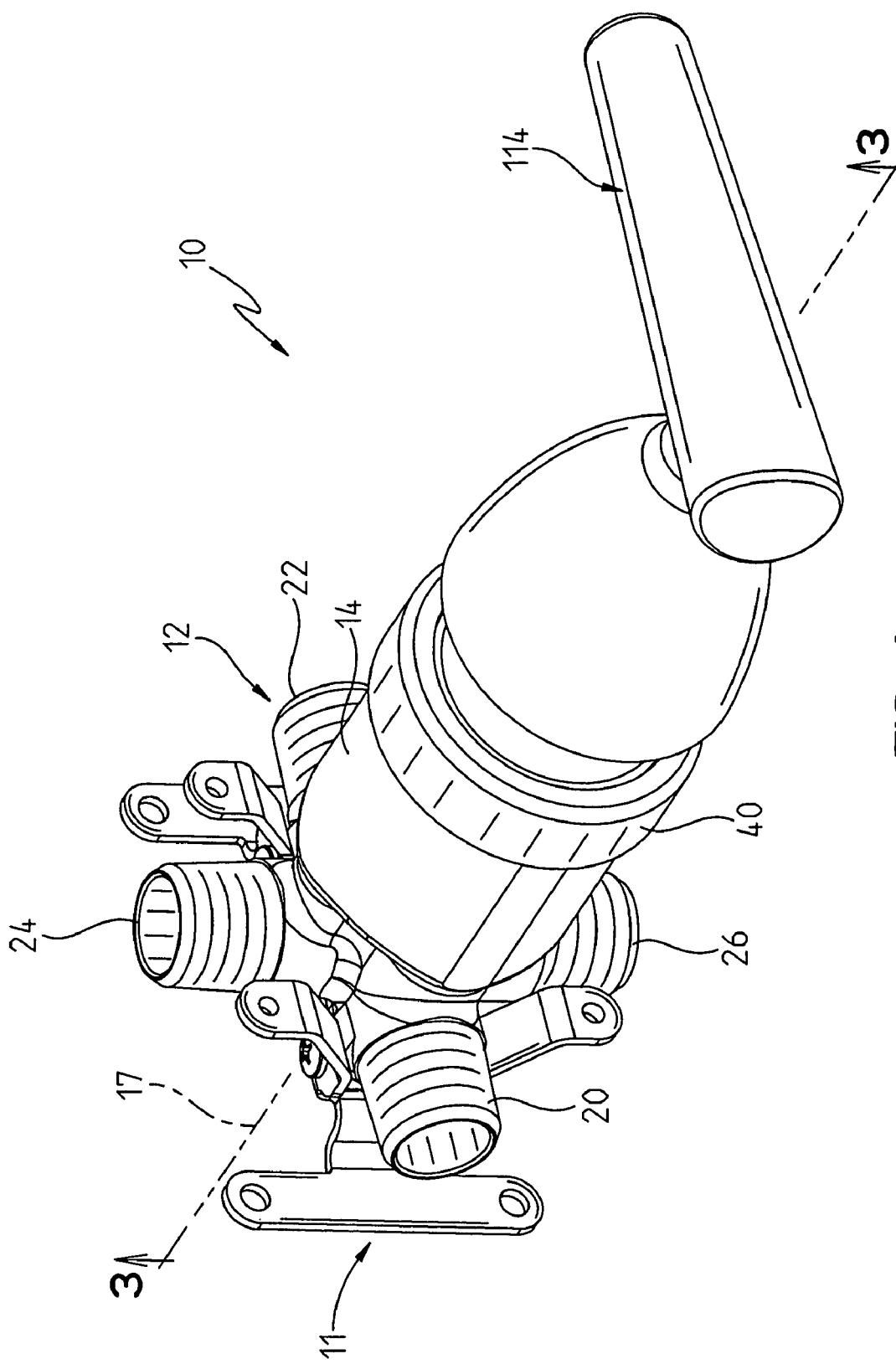
FIG. 1 is a perspective view of an illustrative embodiment mixing valve of the present disclosure.
Figure 2:
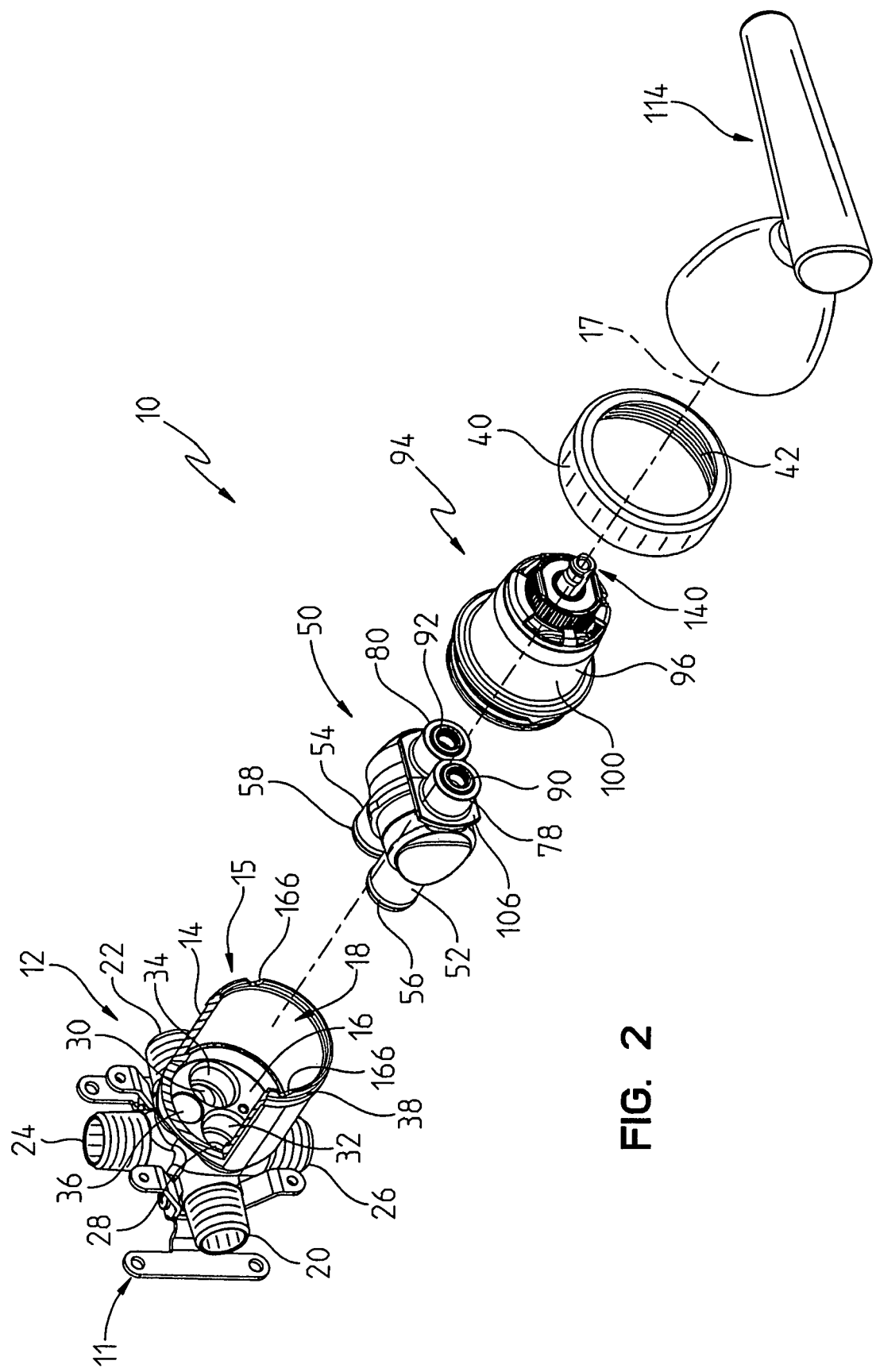
FIG. 2 is an exploded perspective view of the mixing valve of FIG. 1.

Referring initially to FIGS. 1 and 2, an illustrative embodiment mixing valve 10 includes a valve fitting or body 12 which may be mounted behind a shower wall (not shown) by way of a mounting bracket 11. The valve body 12 includes a cylindrical sidewall 14 defining a central housing 15 and extending axially along a longitudinal axis 17 from a bottom wall 16 (FIG. 3) and defining a chamber or cavity 18. The valve body 12 further includes a tubular hot water inlet 20 which is configured to be fluidly coupled to a conventional hot water supply (not shown), and a tubular cold water inlet 22 which is configured to be fluidly coupled to a conventional cold water supply (not shown). First and second tubular outlets 24 and 26 are illustratively fluidly coupled to first and second fluid delivery devices, such as a shower head and a tub spout (not shown).

Figure 3:
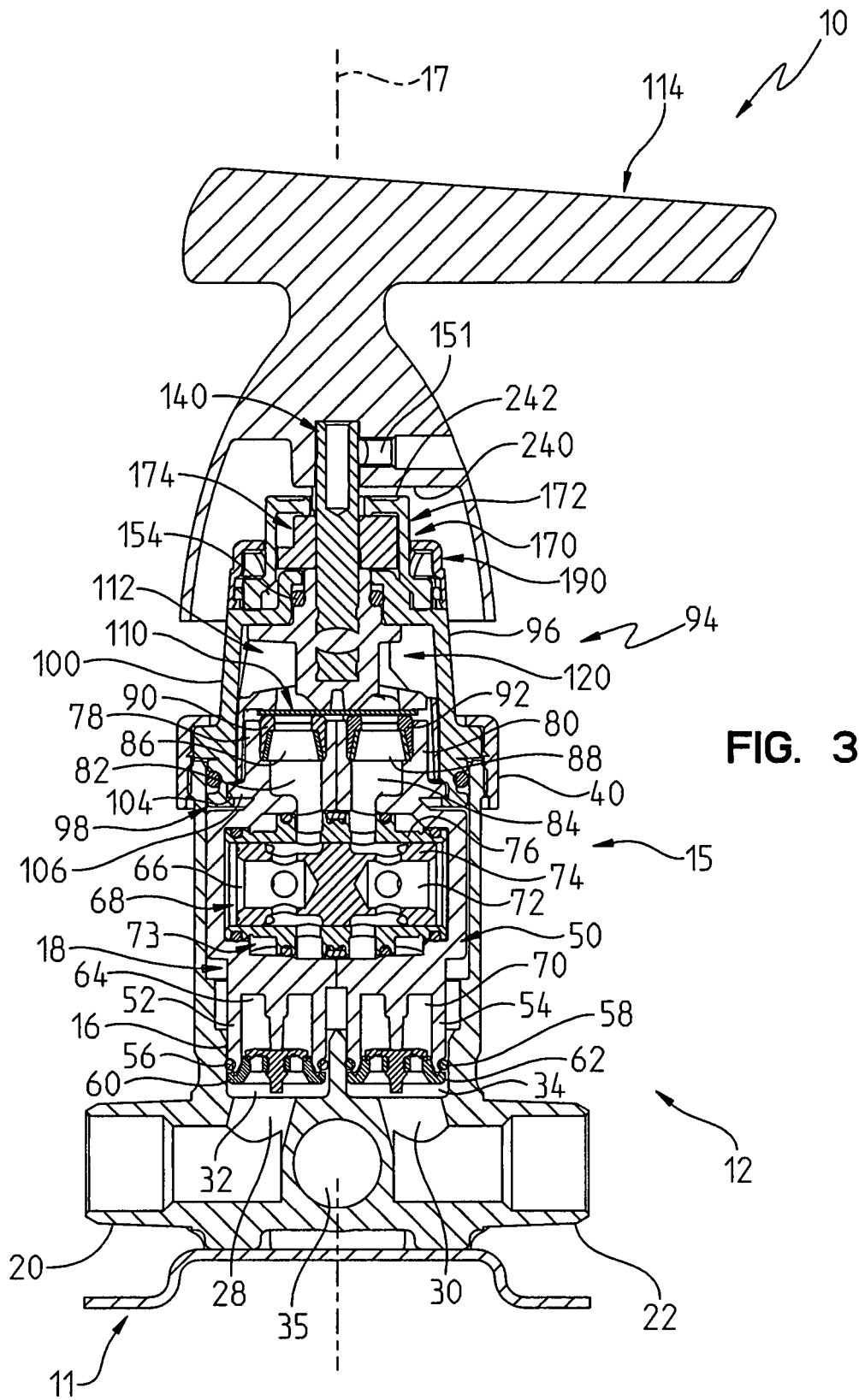
FIG. 3 is a cross-sectional view taken along line 3-3 of FIG. 1.

With reference to FIGS. 2 and 3, the bottom wall 16 includes a hot water supply port 28 in fluid communication with the hot water inlet 20, and a cold water supply port 30 in fluid communication with the cold water inlet 22. The supply ports 28 and 30 may include counterbores 32 and 34, respectively. At least one discharge or outlet port 36 also extends through the bottom wall 16 and is in communication with outlets 24 and 26 through a connecting bore 35 (FIG. 3). A diverter valve (not shown) may be fluidly coupled to the valve fitting 12 to selectively direct water from the outlet port 36 to one of the outlets 24 and 26. Further, an aspirator or ejector (not shown) may be received within the connecting bore 35 to generate a vacuum to prevent water leakage through a shower head connected to the first outlet 24. The sidewall 14 illustratively contains external threads 38 adjacent its top which are adapted to threadably receive a retaining bonnet or nut collar 40 having internal threads 42.

A valve cartridge assembly 50 is illustratively non-rotatably disposed in the cavity 18. The cartridge assembly 50 includes laterally spaced apart axially inwardly projecting first and second tubes 52 and 54. The first tube 52 is illustratively fitted into counterbore 32 of body 12, while the second tube 54 is fitted into the counterbore 34 of the body 12. Seals, illustratively o-rings 56 and 58, are provided to sealingly engage the sidewalls of counterbores 32 and 34 to prevent water from supply ports 28 and 30 from entering the cavity 18 and reaching the outlet port 36.

With further reference to FIG. 3, check valves 60 and 62 are illustratively coupled to the tubes 52 and 54 and are configured to prevent cross-flow of hot water from the hot water inlet 20 into the cold water inlet 22 and vice versa. Such a cross-flow could occur if there is a pressure differential between the hot and cold water inlets 20 and 22.

The first tube 52 includes a passageway 64 leading to a first section 66 of a spool-type pressure balancing valve 68. Similarly, the second tube 54 has a passageway 70 leading to a second section 72 of the pressure balancing valve 68. The pressure balancing valve 68 is illustratively disposed in a chamber 73 of the cartridge assembly 50. The pressure balancing valve 68 may be of conventional design and illustratively includes a piston 74 which is slidably mounted within an outer spool 76. Such illustrative spool-type pressure balancing valves are known in the art and may be of the type shown in U.S. Pat. No. 5,725,010 to Marty et al The cartridge assembly 50 further includes laterally spaced apart axially outwardly extending first and second tubes 78 and 80. The first tube 78 defines a first outlet passageway 82, and the second tube 80 defines a second outlet passageway 84. Outlet passageways 82 and 84 are in fluid communication with the chamber 73. Tubes 78 and 80 include bores 86 and 88 which receive seals, illustratively spring and seal assemblies 90 and 92, respectively.

Referring further to FIGS. 2 and 3, the cartridge assembly 50 is operably coupled to an outer valve assembly 94. More particularly, the outer valve assembly 94 includes a housing cap 96 secured to the cartridge assembly 50 through a bayonet lock 98. The housing cap 96 includes substantially cylindrical sidewall 100 having an inner surface 102 formed with a pair of diametrically opposed arcuate grooves 104. The cartridge assembly 50 includes a bayonet projection 106 configured to be received within the grooves 104 of the cap 96 when rotated to an interlocked position (FIG. 6).

Figure 5:
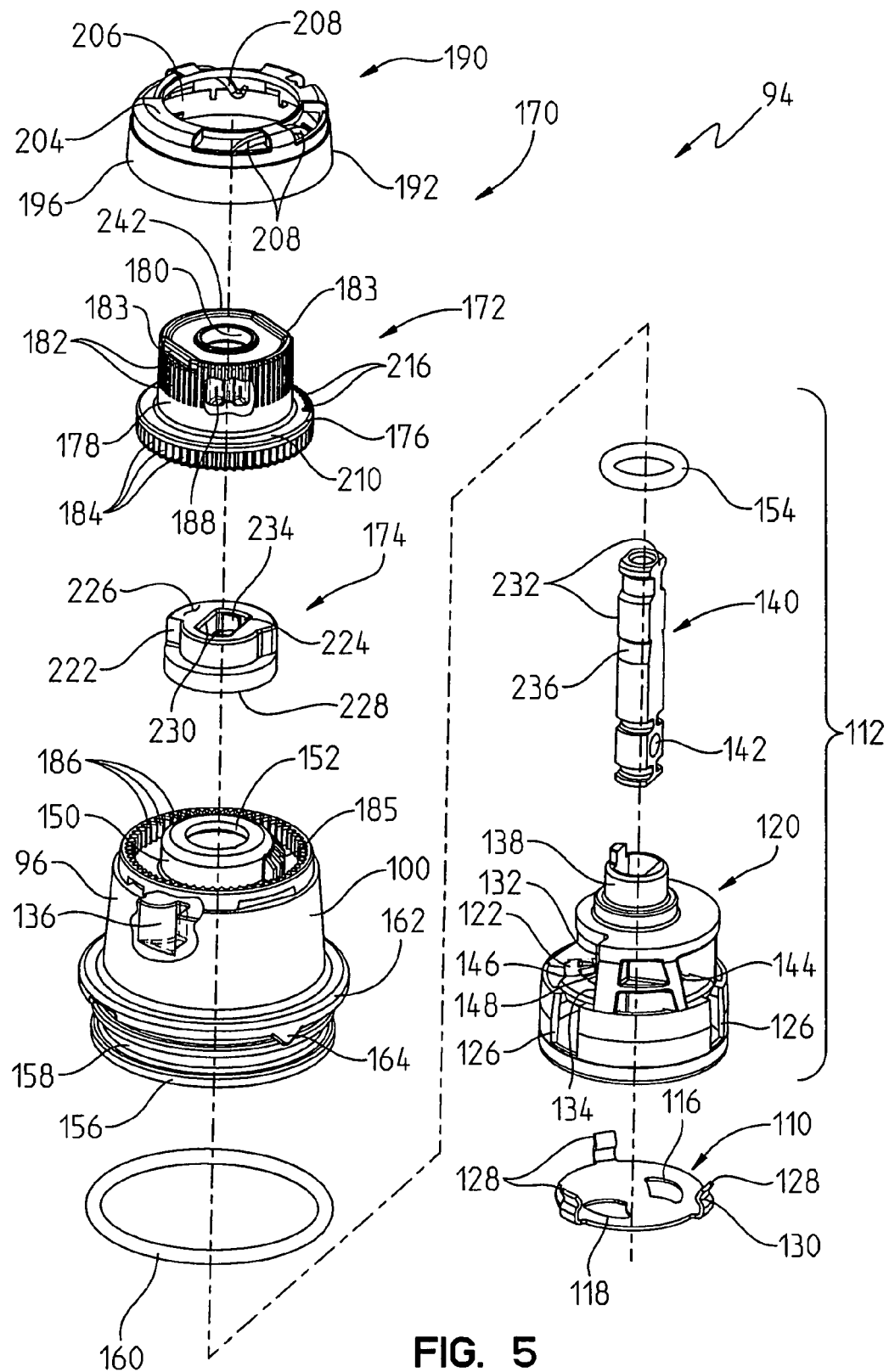
FIG. 5 is an exploded top perspective view of the outer valve assembly of FIG. 4.
Figure 6:
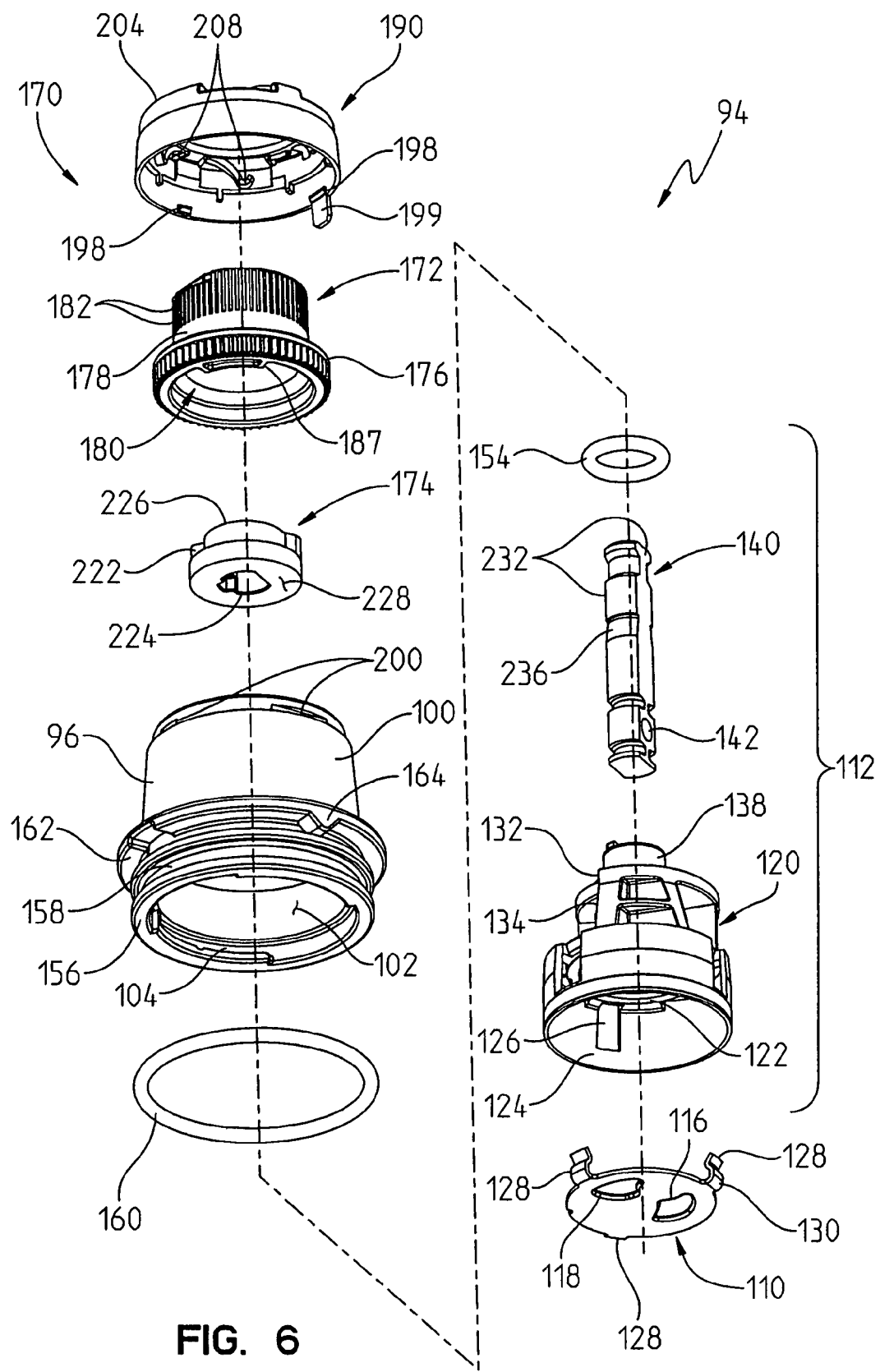
FIG. 6 is an exploded bottom perspective view similar to FIG. 5.
Figure 7:
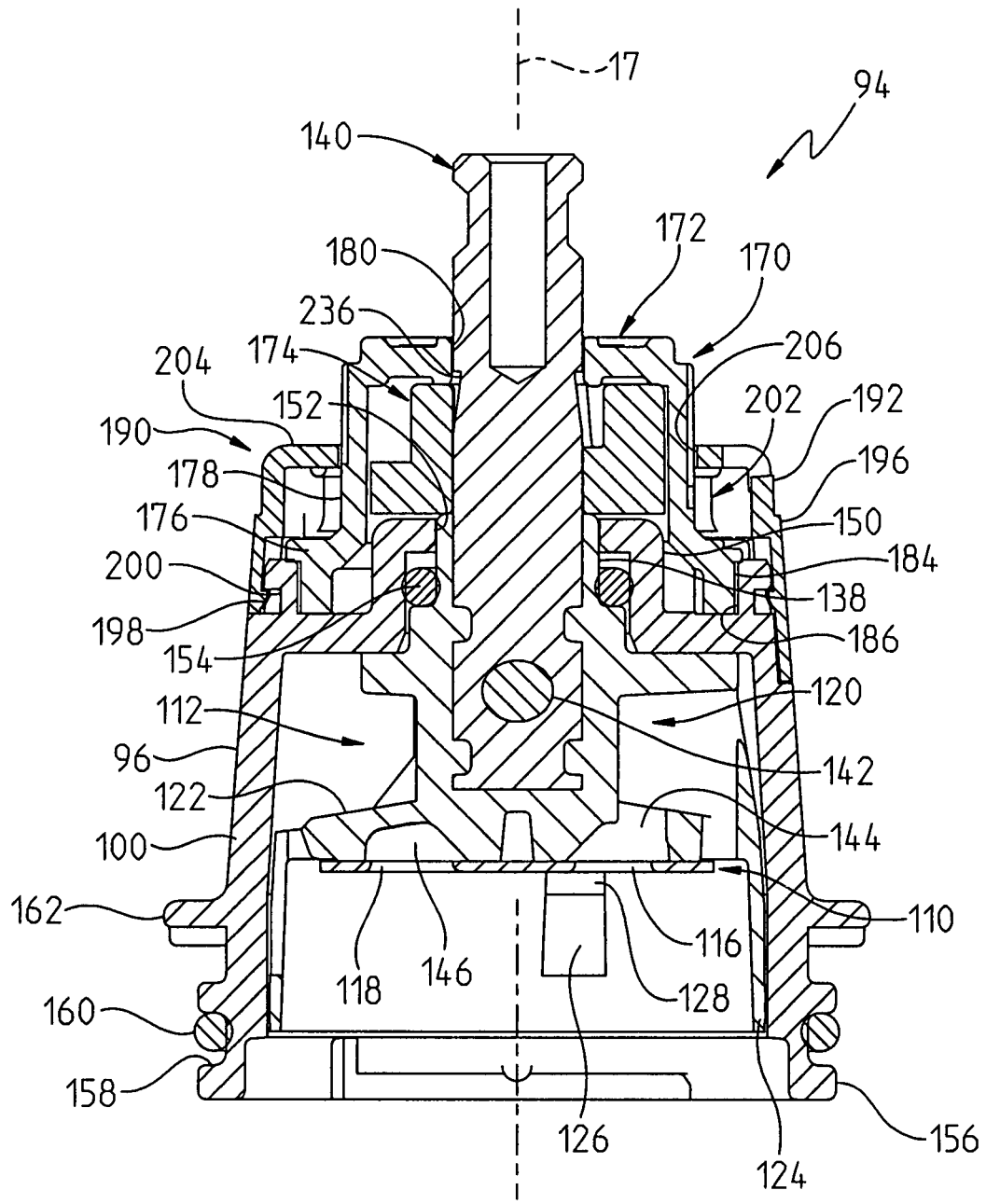
FIG. 7 is a cross-sectional view taken along line 7-7 of FIG. 4.

With reference to FIGS. 5-7, a volume and temperature control valve plate 110, illustratively formed of stainless steel, is operably coupled to a stem assembly 112. The stem assembly 112 is operably coupled to a handle 114 for rotation therewith as detailed herein. The valve plate 110 includes a hot water control aperture 116 and a cold water control aperture 118. As the handle 114 rotates it also rotates the stem assembly 112 about longitudinal axis 17 such that the volume and temperature control valve plate 110 rotates the control apertures 116 and 118 for selective alignment with the hot and cold water outlet passageways 82 and 84, respectively, of the cartridge assembly 50.

As is known, when the stem assembly 112 is in an off position, neither control aperture 116, 118 is in fluid communication with fluid passageways 82, 84, such that no water flows therethrough. Rotation of the stem assembly 112 in a counterclockwise direction from the off position moves the valve plate 110 such that the cold water passageway 84 is in fluid communication with the cold water control aperture 118 to initiate a cold water flow. As rotation continues, the hot water control aperture 116 begins to align with hot water passageway 82 to start hot water flow. At a full counterclockwise orientation, maximum hot water flow is provided through hot water control aperture 116. The control apertures 116 and 118 in the valve plate 110 are in communication with the outlet port 36. More particularly, water flowing through control apertures 116 and 118 mixes within the cap 96 and flows around cartridge assembly 50 to the outlet port 36.

With further reference to FIGS. 5-7, the stem assembly 112 includes a stem receiver 120, illustratively made of a thermoplastic, having a support member 122 and downwardly extending cylindrical skirt 124. Axially extending notches 126 are formed within the skirt 124 and extend into the support member 122. The notches 126 receive corresponding tabs 128 on the control valve plate 110. An inwardly extending portion 130 of each tab 128 is configured to secure the plate 110 to the support member 122. The stem receiver 120 includes a stop surface 132 defined by an end wall 134 which is configured to engage a radially inwardly extending stop shoulder or projection 136 formed within the cap 96 (FIG. 6) to limit clockwise rotation of the stem assembly 112. The stem receiver 120 further includes an upper portion 138 which receives a stem 140. The stem 140 is affixed against rotation relative to the stem receiver 120. In one illustrative embodiment, the stem receiver 120 may be molded through an opening 142 extending through the stem 140.

Hot and cold water openings 144 and 146 are formed within the support member 122 of the stem receiver 120 and are in fluid communication with the hot and cold water control apertures 116 and 118, respectively of the valve plate 110. Ribs 148 may extend within the openings 144 and 146 in order to provide additional support to the support member 122 (FIG. 5).

With further reference to FIGS. 5 and 7, the stem assembly 112 is rotatably received within the cap 96, with the upper portion 138 thereof fitting within a reduced diameter portion 150 of the housing cap 96. The stem 140 extends axially outwardly through the housing cap 96 through a center aperture 152. The handle 114 is coupled to the stem 140, illustratively through a set screw 151 (FIG. 3), to rotate therewith. A sealing o-ring 154 is illustratively disposed between the inner surface of the reduced diameter portion 150 of the housing cap 96 and the upper portion 138 of the stem assembly 112.

The housing cap 96 includes a base portion 156 having an annular groove 158 for receiving an o-ring 160. The cap 96 further includes an annular flange 162 positioned above the base portion 156. The flange 162 has a pair of diametrically opposed, axially extending keys 164 that fit within slots 166 at the open upper end of the sidewall 14 of valve body 12. Each key 164 illustratively has a convex, rounded shape, while each slot 166 is of a complementary concave shape. This arrangement allows for ease of assembly and disassembly of the cartridge assembly 50 by allowing the housing cap to cam in or out of the housing 15 of valve body 12.

As illustrated in FIG. 3, the base portion 156 of the housing cap 96 fits within the housing 15 of valve body 12. The o-ring 160 is disposed between the outer surface of the base portion 156 and the inner surface of the sidewall 14 of the housing 15 to prevent leakage between the housing cap 96 and the valve body 12. The bottom of the annular flange 162 abuts against the top of the sidewall 14 of the housing 15.

With reference to FIGS. 5-7, 9 and 10, a maximum hot water temperature may be set by adjusting a temperature limit stop assembly 170 which includes a stop member or sleeve 172 and a cooperating limit stop actuator or disk 174. The stop member 172 is illustratively formed of a thermoplastic material and includes a base 176 supporting an axially outwardly extending cylindrical sidewall 178. A central opening 180 is formed within the stop member 172 and is configured to receive the stem 140. A plurality of ridges 182 are formed within the outer surface of the cylindrical sidewall 178 and are configured to provide an enhanced gripping surface for the user. Flats 183 may be formed proximate an outer end of the stop member 172 to further facilitate gripping and aid in the assembly process by facilitating proper orientation of the stop member 172.

The base 176 of stop member 172 includes a plurality of radially outwardly extending teeth or splines 184 which are configured to selectively engage a plurality of radially inwardly extending splines 186 formed within the inside surface of the sidewall 100 of cap 96. A plurality of ribs 185 (FIG. 5) extend radially outwardly from portion 150 of the cap 96 and cooperate with a projection 187 (FIG. 6) supported by the base 176 of the stop member 172 in order to prevent rotational positioning of the stop member 172 when the ribs 185 and the projection 187 are axially aligned.

A stop shoulder 188 extends radially inwardly from an inner surface of the sidewall 178. As further detailed herein, the stop shoulder 188 is configured to be selectively axially and rotationally adjusted relative to the stem 140 by moving the stop member 172 relative to the cap 96.

A retainer 190 is coupled to the cap 96 and is configured to retain the stop member 172 to the cap 96. More particularly, the retainer 190 illustratively includes an annular housing 192 having a cylindrical support wall 196. A plurality of clips 198 extend radially inwardly from an inner surface of support wall 196 and are configured to cooperate with mating members 200 supported by the cap 96. More particularly, in one illustrative embodiment, the clips 198 are formed integrally with the support wall 196 and are configured to engage within clip retainer openings 200 formed within the outer surface of the cap 96. A locating tab 199 illustratively extends from the wall 196 and is configured to be received within a recess 201 formed within the cap 96 (FIG. 4) for facilitating proper orientation of the retainer 190 relative to the cap 96.

The base 176 of the stop member 172 is received within a chamber 202 defined intermediate the cap 96 and an end wall 204 of the retainer 190 (FIG. 7), while the sidewall 178 of the stop member 172 extends axially through a center opening 206 formed within end wall 204 of the retainer 190. A plurality of biasing members 208, illustratively resilient arms, extend downwardly from the end wall 204 and are configured to slidably engage an outer engagement surface 210 defined by the base 176 of the stop member 172. The arms 208 are positioned relative to the underside of the end wall 204 to apply substantially constant force to the engagement surface 210 of the stop member 172. Such force also retains the stop member 172 in the installed position during transit and final assembly by maintaining engagement between the splines 184 and 186. Furthermore, the arms 208 apply an axially directed force to the stop member 172 and return it to the proper set position following adjustment.

Figure 8:
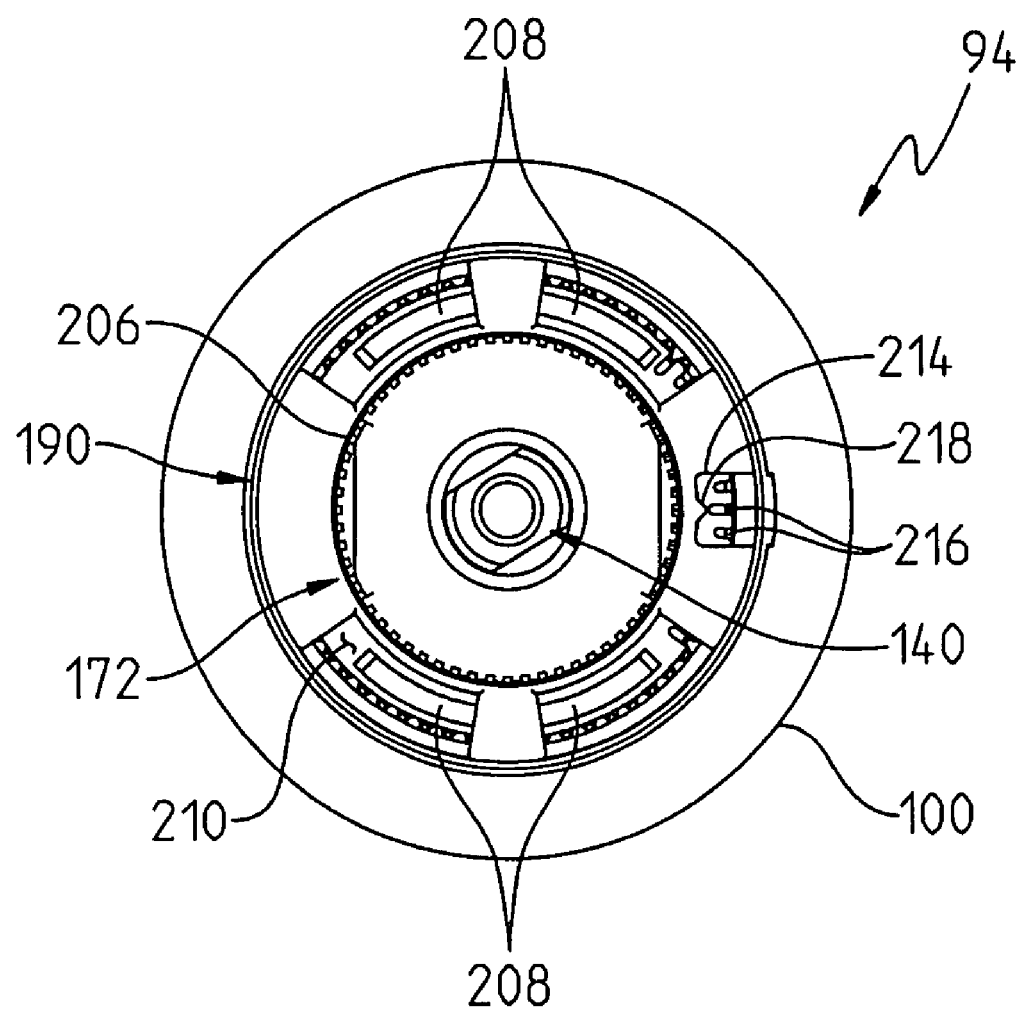
FIG. 8 is a top plan view of the outer valve assembly of FIG. 4, showing a temperature window and cooperating indicator marks.
Figure 9:
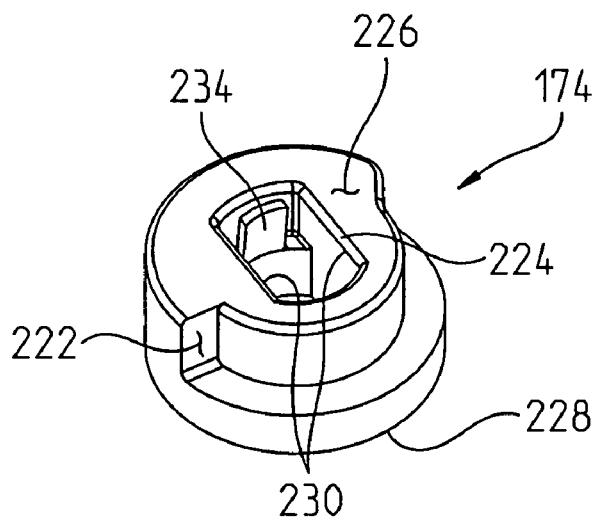
FIG. 9 is top perspective view of a limit stop disk for use with the temperature rotational limit stop assembly of FIG. 4.
Figure 10:
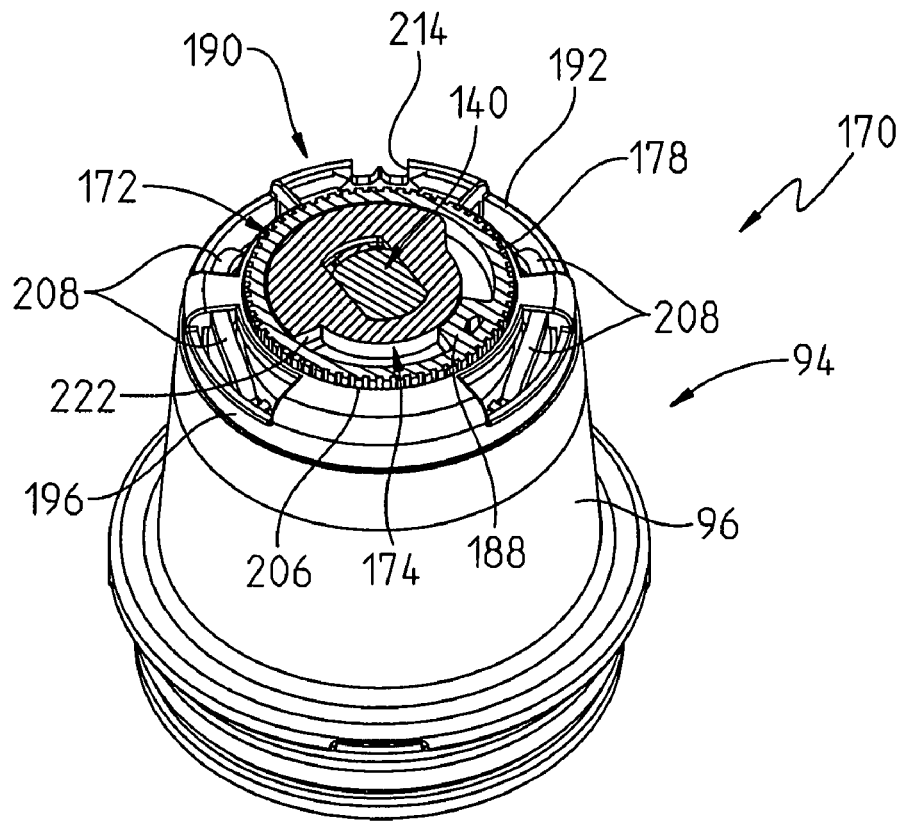
FIG. 10 is a top perspective view, in partial section, of the outer valve assembly of FIG. 4, showing interaction between the limit stop disk and the stop member.

With reference to FIG. 8, a viewing window 214 is formed within the end wall 204 of the housing 192 to facilitate adjustment of the stop member 172 during assembly and final installation. Indicia or indicator marks 216 are supported by the surface 210 of the base 176 and are visible through the viewing window 214 to aid in establishing the correct temperature setting. An indicator or pointer 218 is illustratively supported by the end wall 204 and extends within the window 214 to facilitate proper alignment of marks 216.

With reference now to FIGS. 5-7, 9, and 10, the limit stop actuator or disk 174 is coupled to the stem 140 and is configured to rotate therewith. The limit stop actuator 174 includes a stop surface 222 which is configured to selectively engage the stop shoulder 188 of the stop member 172 in response to counterclockwise rotation. In other words, counterclockwise rotation of the stem 140, and hence the valve plate 110, is limited due to engagement of the stop surface 222 and shoulder 188. In one illustrative embodiment, the stop actuator 174 includes a through opening 224 extending from an outer surface 226 to an inner surface 228. The opening 224 illustratively includes a cross-sectional shape corresponding to cross-sectional shape of a portion of the stem 140. More particularly, the opening 224 includes opposing flat walls 230 configured to engage flat portions 232 of the stem 140.

A resilient retainer clip 234 illustratively extends within opening 224 of the stop actuator 174 and is configured to be received within a retaining groove 236 formed within the stem 140. More particularly, during assembly the stop actuator 174 is pressed onto the stem 140 until the retainer clip 234 snaps into the retainer groove 236 and locks it in place. As the stop actuator 174 is pressed onto the stem 140, the clip 234 flexes out of the way until it reaches the groove 236. At that point, the clip 234 returns to its original position and retains the stop actuator 174 on the stem 140. It should be noted that the clip 234 is typically needed to retain the stop actuator 174 only prior to assembly (e.g., during transportation), since following assembly the stop actuator 174 is retained between the stop member 172 and the housing cap 96.

The stop surface 222 acts as the main interface between the stop actuator 174 and the stop member 172. As the stem 140 is rotated, the stop surface 222 will contact the internal stop shoulder 188 of the stop member 172 and limit the maximum flow of hot water. The maximum hot water can be adjusted by pulling and rotating the stop member 172 as detailed herein. In certain other illustrative embodiments, the limit stop actuator 174 supporting the stop surface 222 may comprise a conventional stop stud which extends in a transverse direction through the stem 140.

The stop member 172 has a set mode of operation where the splines 184 of the stop member 172 engage with the splines 186 of the cap 96. Further, the stop member 172 includes an adjustment mode of operation where the stop member 172 is axially displaced from the cap 96 such that the splines 184 of the stop member 172 are disengaged from the splines 186 of the cap 96 and the stop member 172 is rotatable. More particularly, the stop member 172 may be axially displaced outwardly away from the cap 96 (and away from the valve body 12) such that the splines 184 and 186 are no longer engaged. As such, the stop member 172 is rotatable such that the stop shoulder 188 orientation may be adjusted. As noted above, ribs 185 (FIG. 5) may limit the range of adjustment of the stop member 172. Once adjusted, the stop member 172 may then be released. The biasing members 208 then again force the stop member 172 toward the cap 96 such that the splines 184 and 186 engage, thereby locking the stop member 172 from rotational movement relative to the cap 96. As detailed herein, the stop shoulder 188 of the stop member 172 sets a hot water temperature limit by engaging and thereby limiting counter-clockwise rotation of the stop surface 222 and hence, the stem assembly 112 and the hot water control aperture 116 of the valve plate 110.

Figure 4:
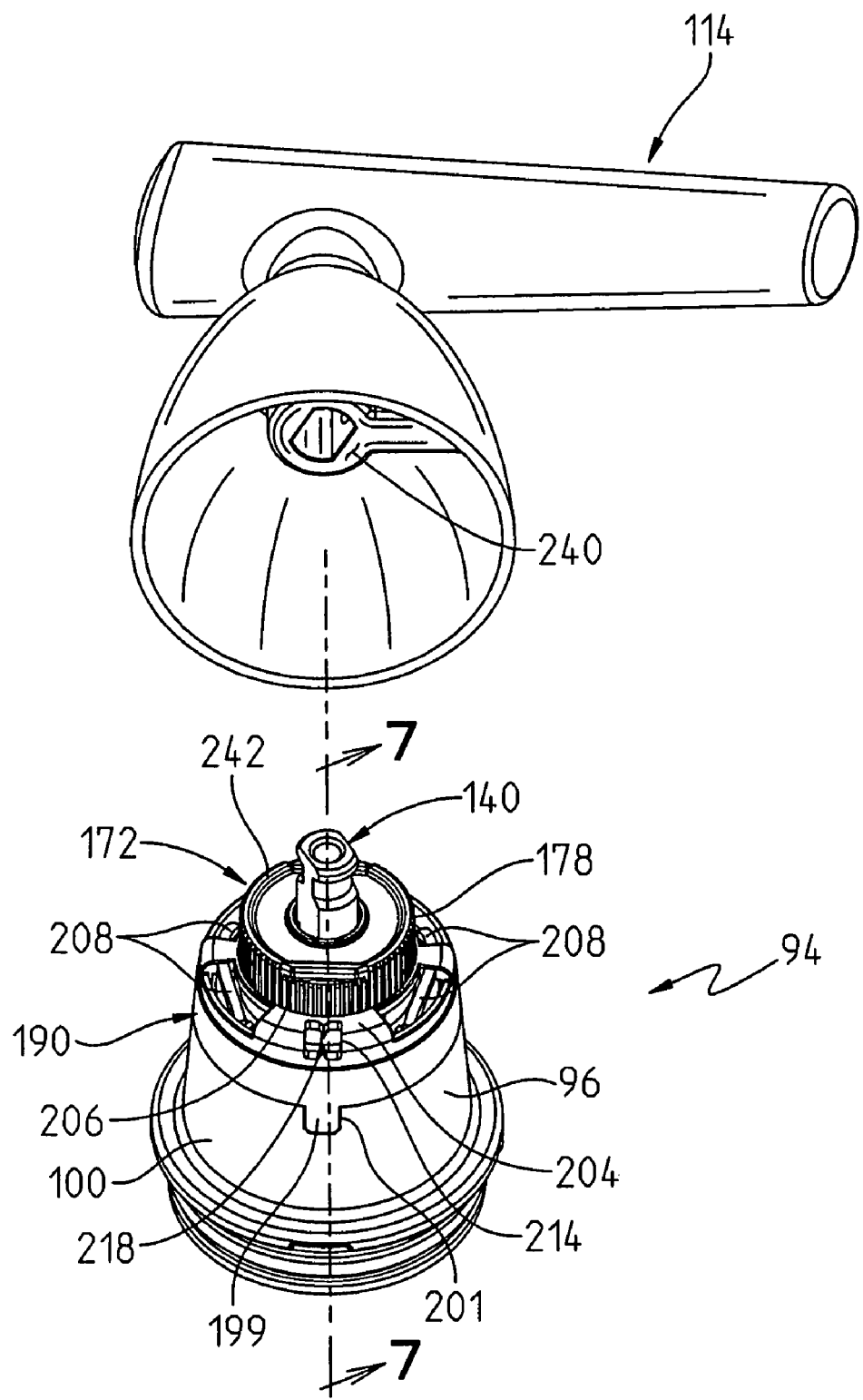
FIG. 4 is a partial perspective view of the mixing valve of FIG. 1, showing an outer valve assembly, including an illustrative embodiment temperature rotational limit stop assembly, and a handle, with partial cut-aways of the housing cap and the stop member.

With reference to FIGS. 3 and 4, the handle 114 includes an inwardly facing retaining surface 240 configured to cooperate with an outwardly facing engagement surface 242 of the stop member 172. More particularly, outward axial movement of the stop member 172 is restricted by the engagement surface 242 contacting the retaining surface 240.

Figure 11:
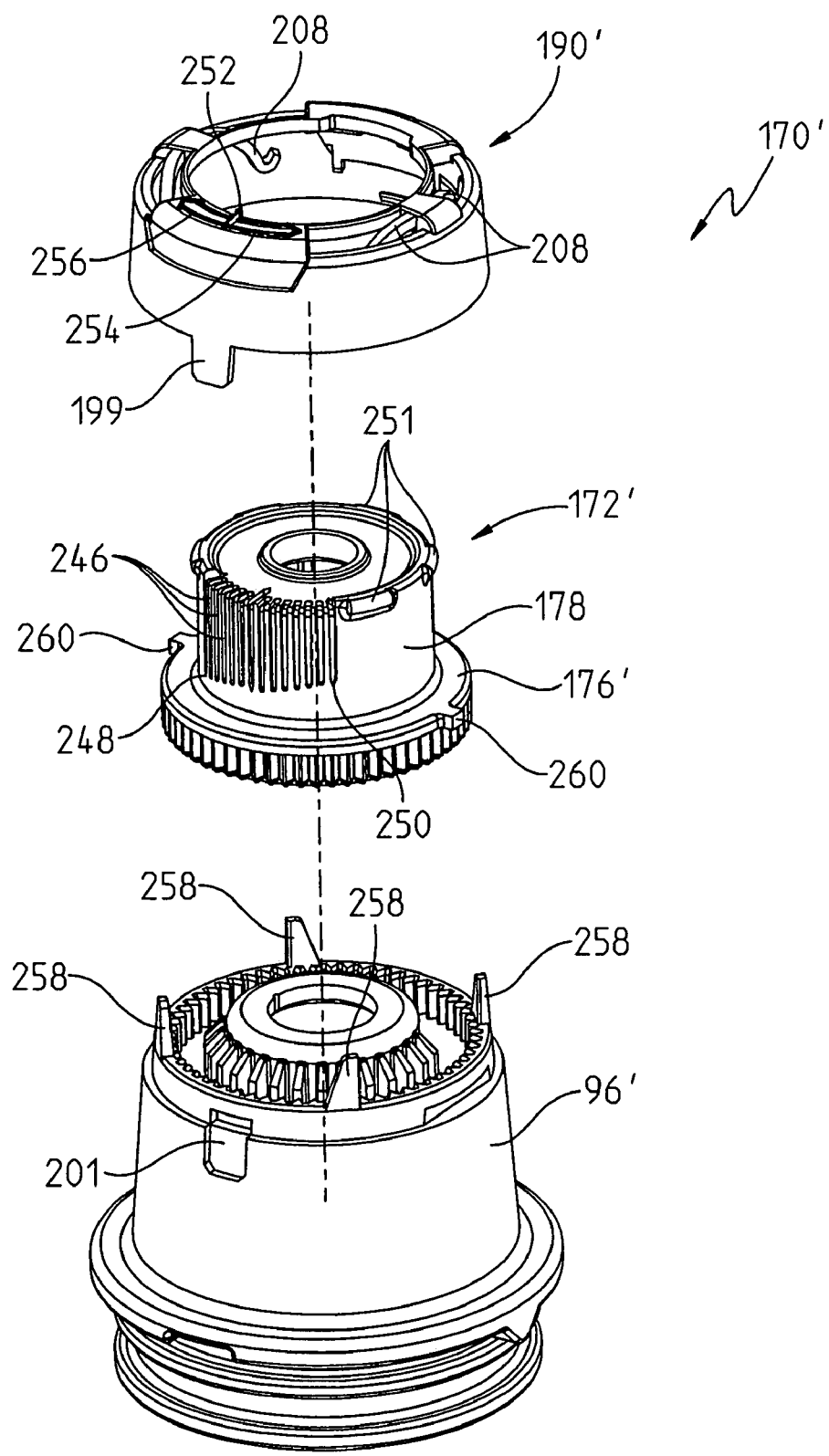
FIG. 11 is an exploded top perspective view showing further illustrative embodiment housing cap, stop member, and retainer.
Figure 12:
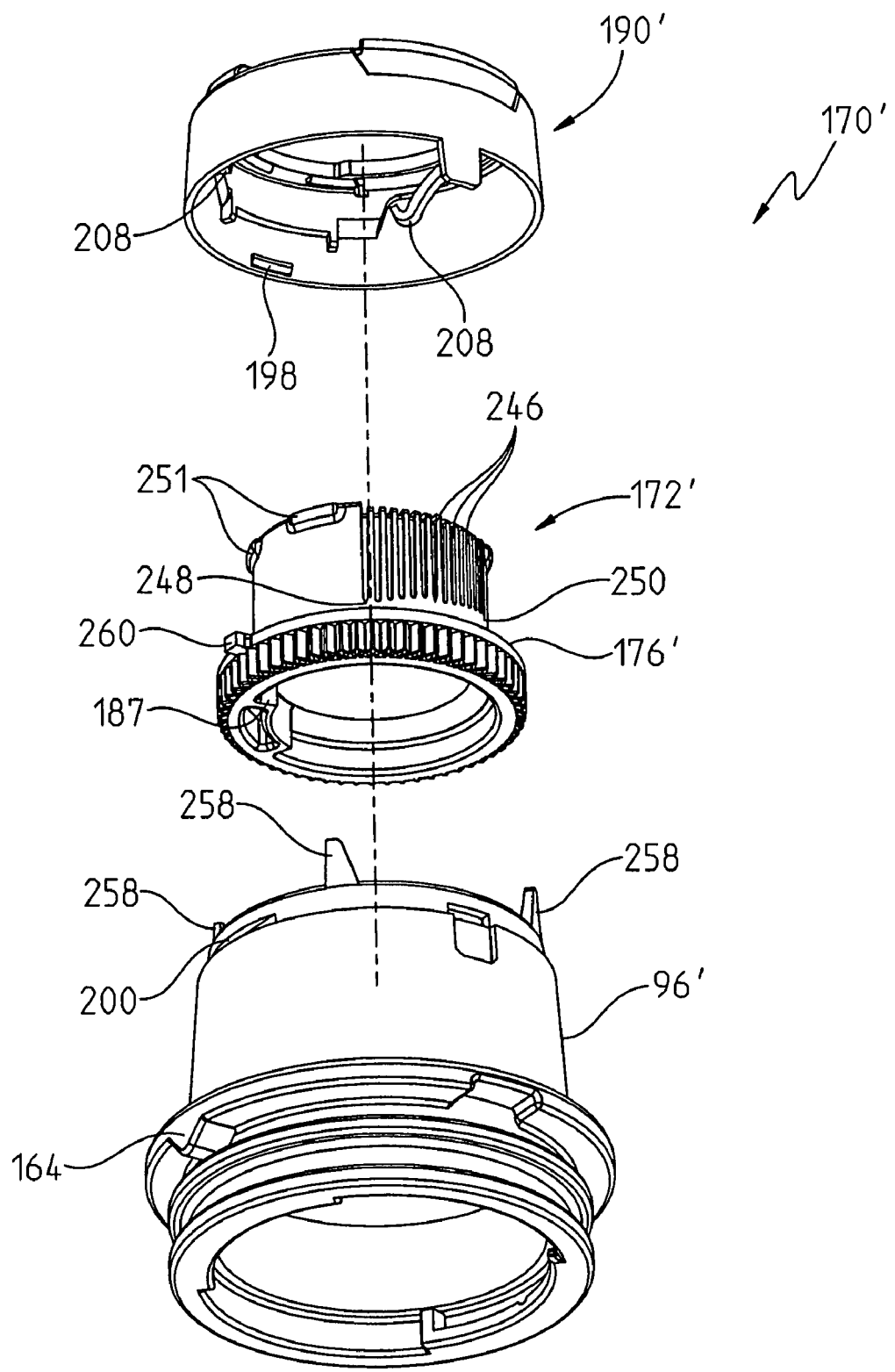
FIG. 12 is an exploded bottom perspective view similar to FIG. 11.
Figure 13:
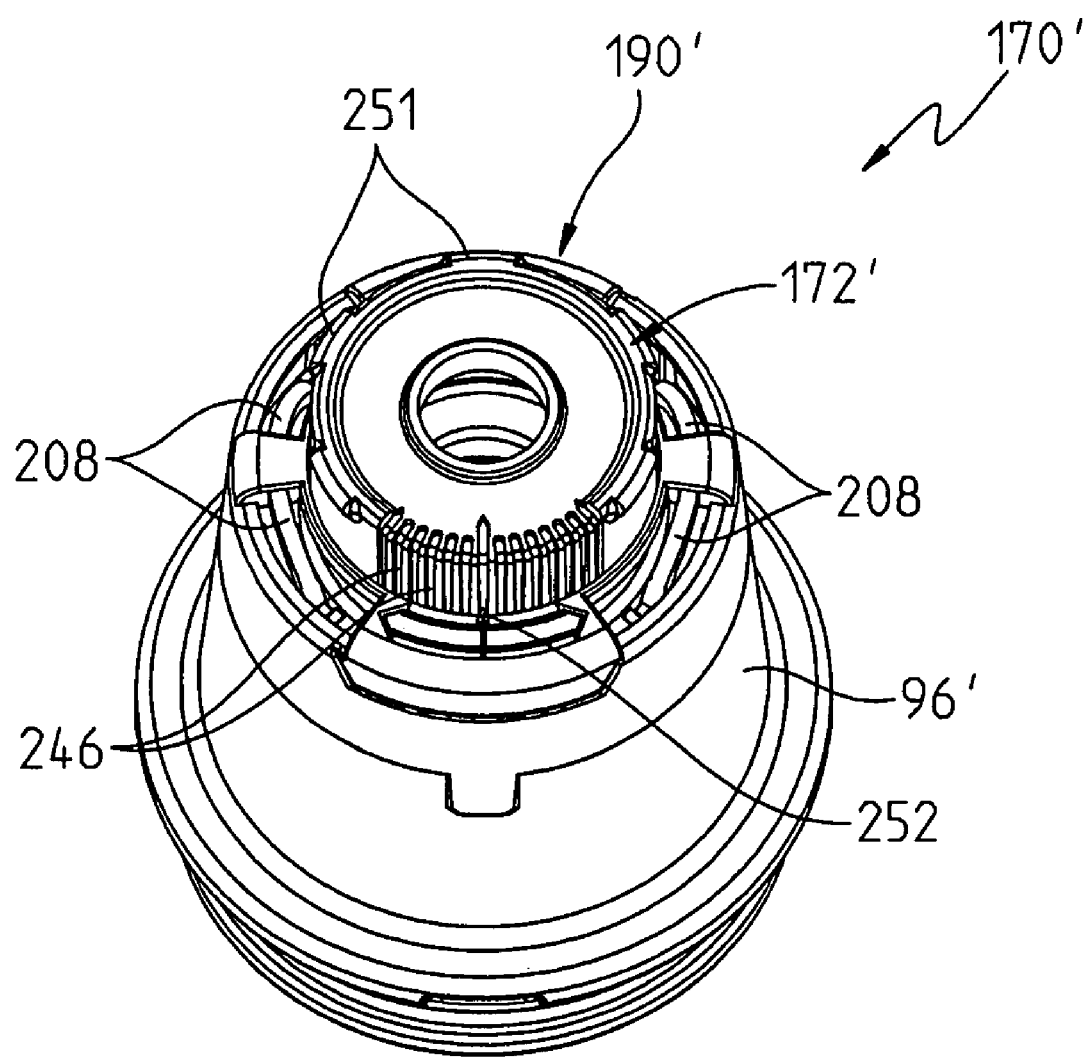
FIG. 13 is a perspective view showing the assembly of housing cap, stop member, and retainer of FIG. 11.

Referring now to FIGS. 11-13, a further illustrative embodiment limit stop assembly 170' is shown as including many similar features as those identified above with respect to the rotational limit stop assembly 170 of FIGS. 4-8. As such, similar components are identified with like reference numbers.

The stop member 172' of the rotational limit stop assembly 170' includes axially extending, circumferentially spaced indicator marks 246. More particularly, the indicator marks 246 are formed within an outer portion of the cylindrical sidewall 178 of the stop member 172'. The bottom of the indicator marks 246 are axially displaced from each other to define a gradient extending from a low point 248 to a high point 250. In other words, the indicator marks are longer as viewed in a clockwise direction, such that longer marks 246 represent a higher temperature setting of the stop member 172'.

A plurality of radially outwardly extending, circumferentially spaced grip members 251 are supported proximate the outer end of the stop member 172'. The grip members 251 facilitate tactile engagement with a user's fingers.

The retainer 190' illustratively includes a radially inwardly extending indicator arrow 252 configured to selectively align with different indicator marks 246. Indicia, such as arrows 254 and 256, illustratively with associated text (e.g., "Hotter" and "Colder") or colors (e.g., red and blue), may be positioned on opposite sides of the indicator arrow 252 to facilitate proper rotation of the stop member 172' (i.e., counter-clockwise and clockwise) to increase or decrease the temperature limit.

A plurality of axially extending, circumferentially spaced stop tabs 258 are supported by the outer end of the housing cap 96' and are configured to cooperate with radially outwardly extending stop tabs 260 supported by the base 176' of the stop member 172'. More particularly, engagement between the stop tabs 258 and 260 limit rotation of the stop member 172' relative to the housing cap 96', thereby limiting adjustment of the temperature limit.

With reference now to FIGS. 14-17, a further illustrative embodiment limit stop assembly 270 is shown as including many similar features as those identified above with respect to the rotational limit stop assembly 170 of FIGS. 4-8. As such, similar components are identified with like reference numbers.

Figure 14:
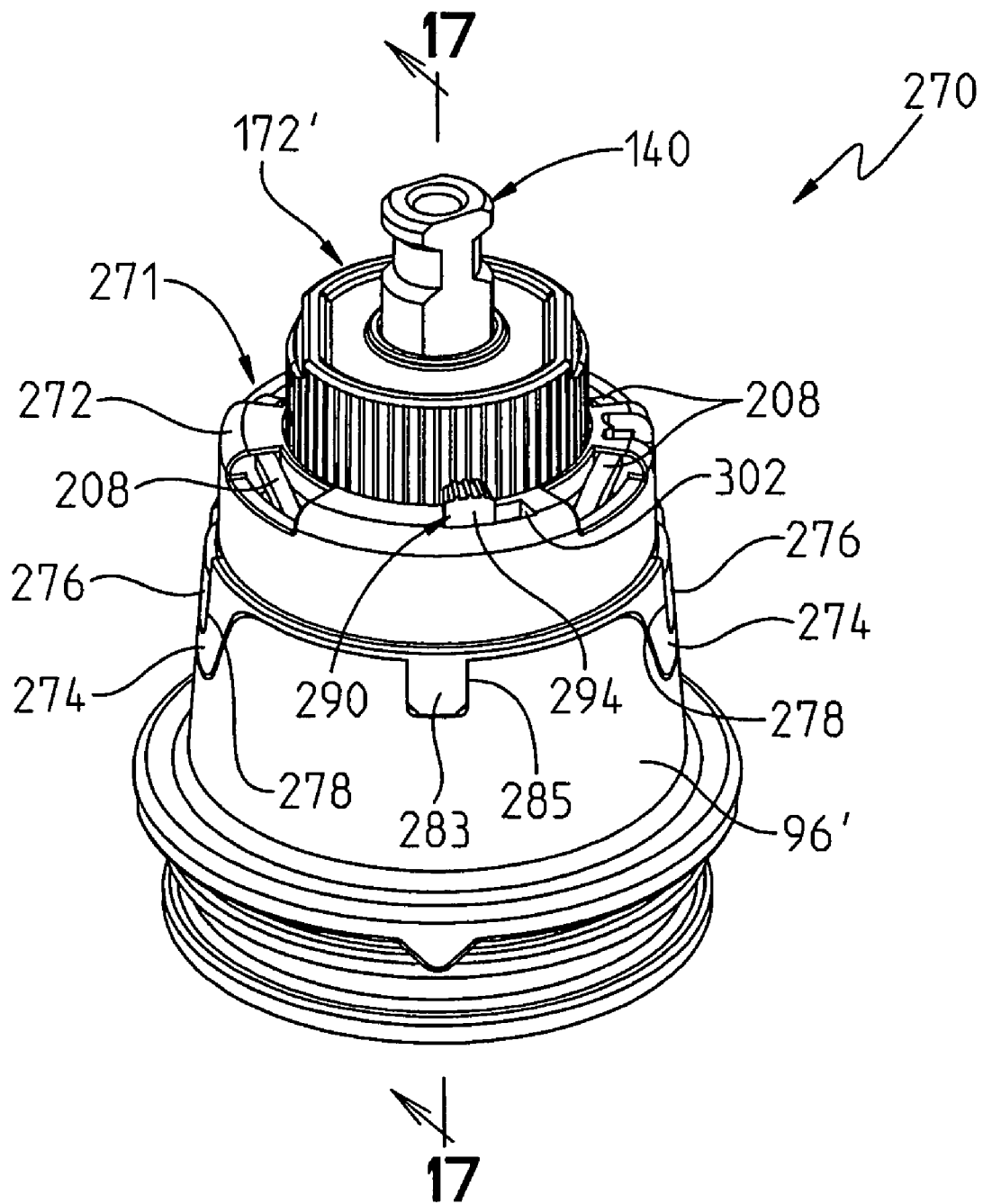
FIG. 14 is a perspective view of an outer valve assembly including a further illustrative embodiment temperature rotational limit stop assembly.
Figure 15:
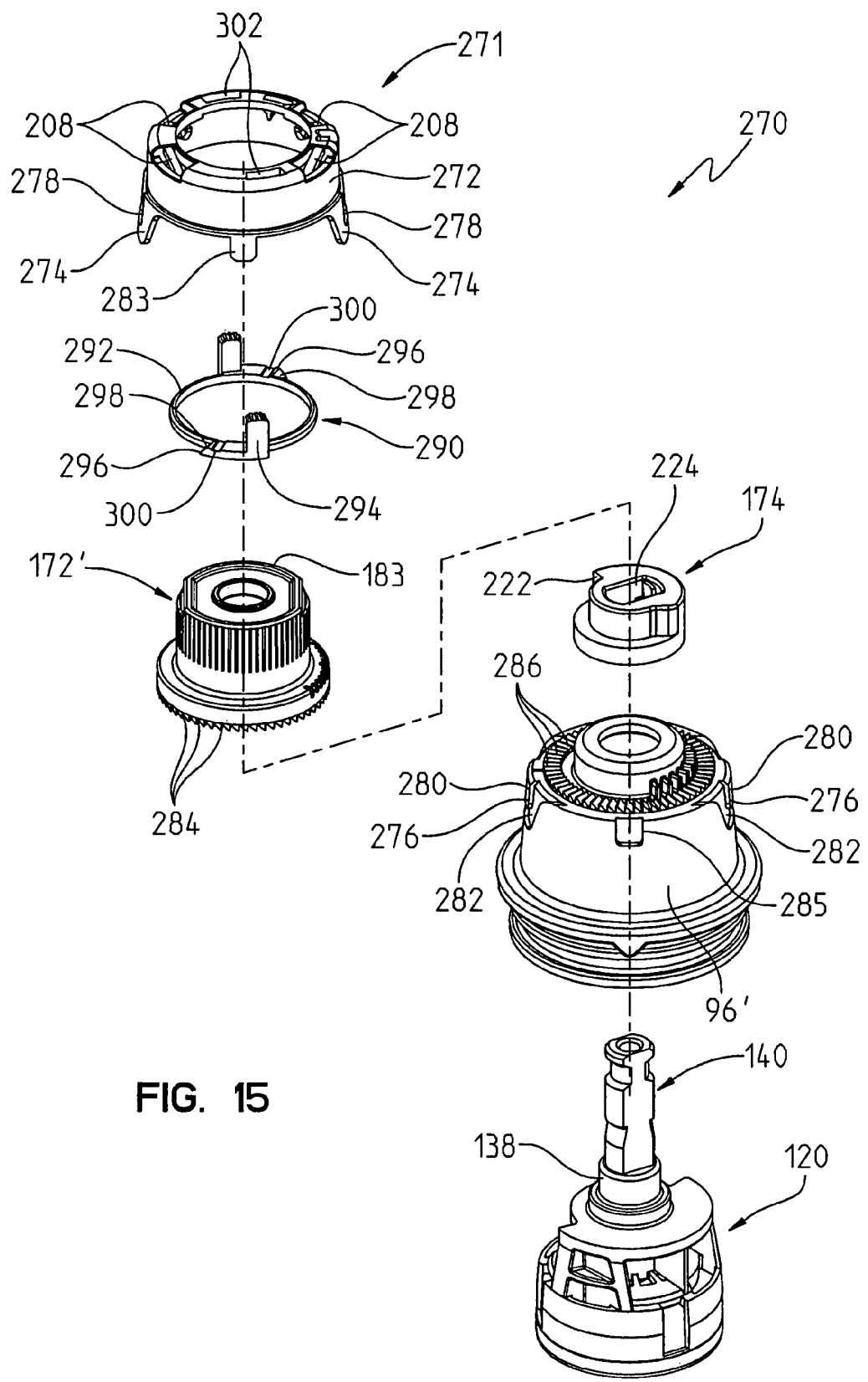
FIG. 15 is an exploded top perspective view of the outer valve assembly of FIG. 14.

With further reference to FIG. 14, the rotational limit stop assembly 270 includes a retainer 271 having a housing 272 with external clips 274 that cooperate with mating members 276 supported by the outside surface of the cap 96'. More particularly, each clip 274 includes an opening 278 receiving the mating member 276, illustratively a tab 280 surrounded by a recess 282. As such, the clips 274 are flush with the outer surface of the cap 96' to prevent damage or from being knocked out of adjustment during installation or replacement. A locating projection 283 may extend from the housing 272 and is received within a slot 285 for facilitating proper orientation of the retainer 271 relative to the cap 96'. Additionally, the splines 284 of the stop member 172' extend in an axial direction and are configured to selectively engage with the splines 286 of the cap 96', which also extend in an axial direction. As such, the splines 284 and 286 provide for an axially mating configuration.

Figure 16:
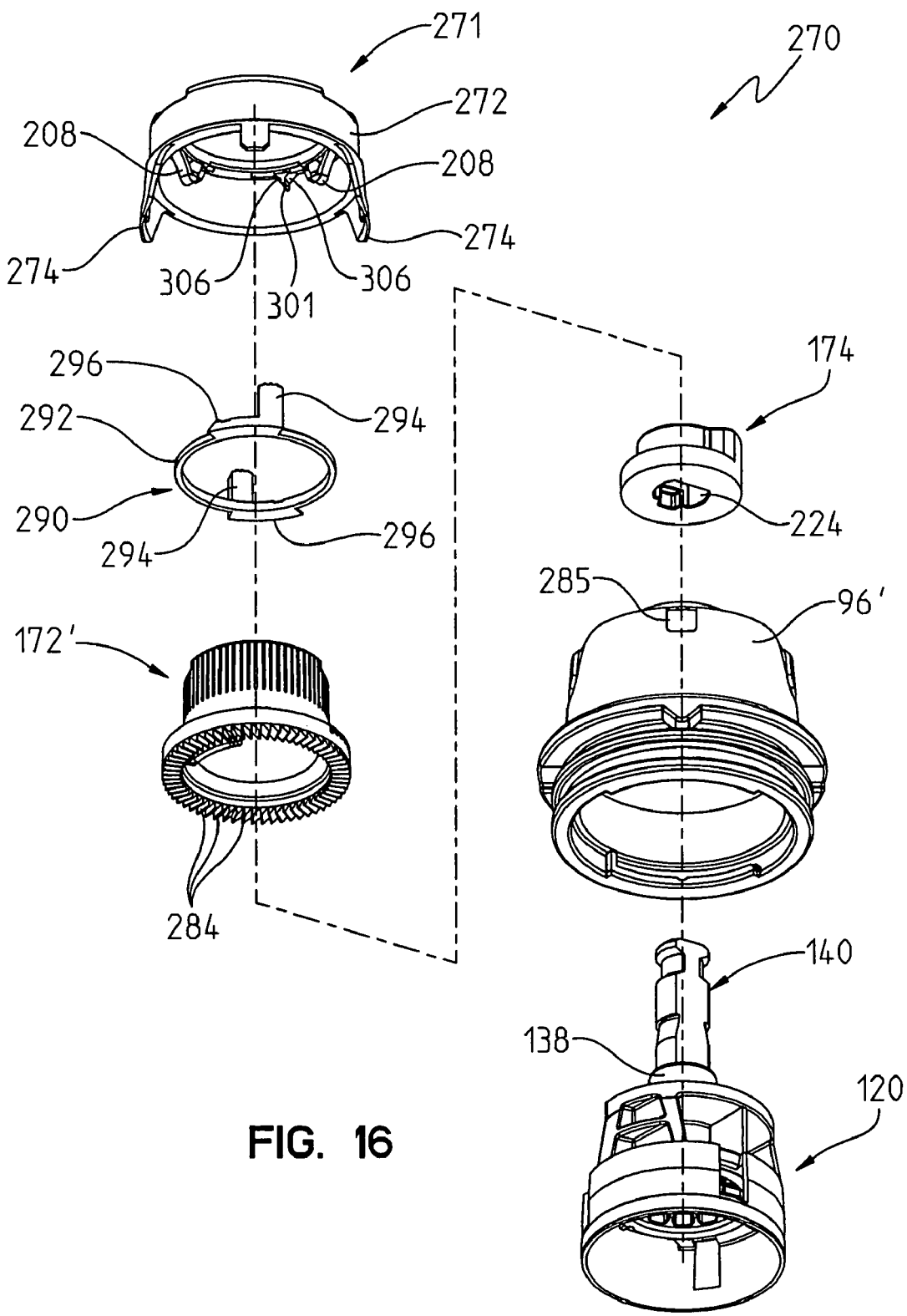
FIG. 16 is an exploded bottom perspective view similar to FIG. 15.
Figure 17:
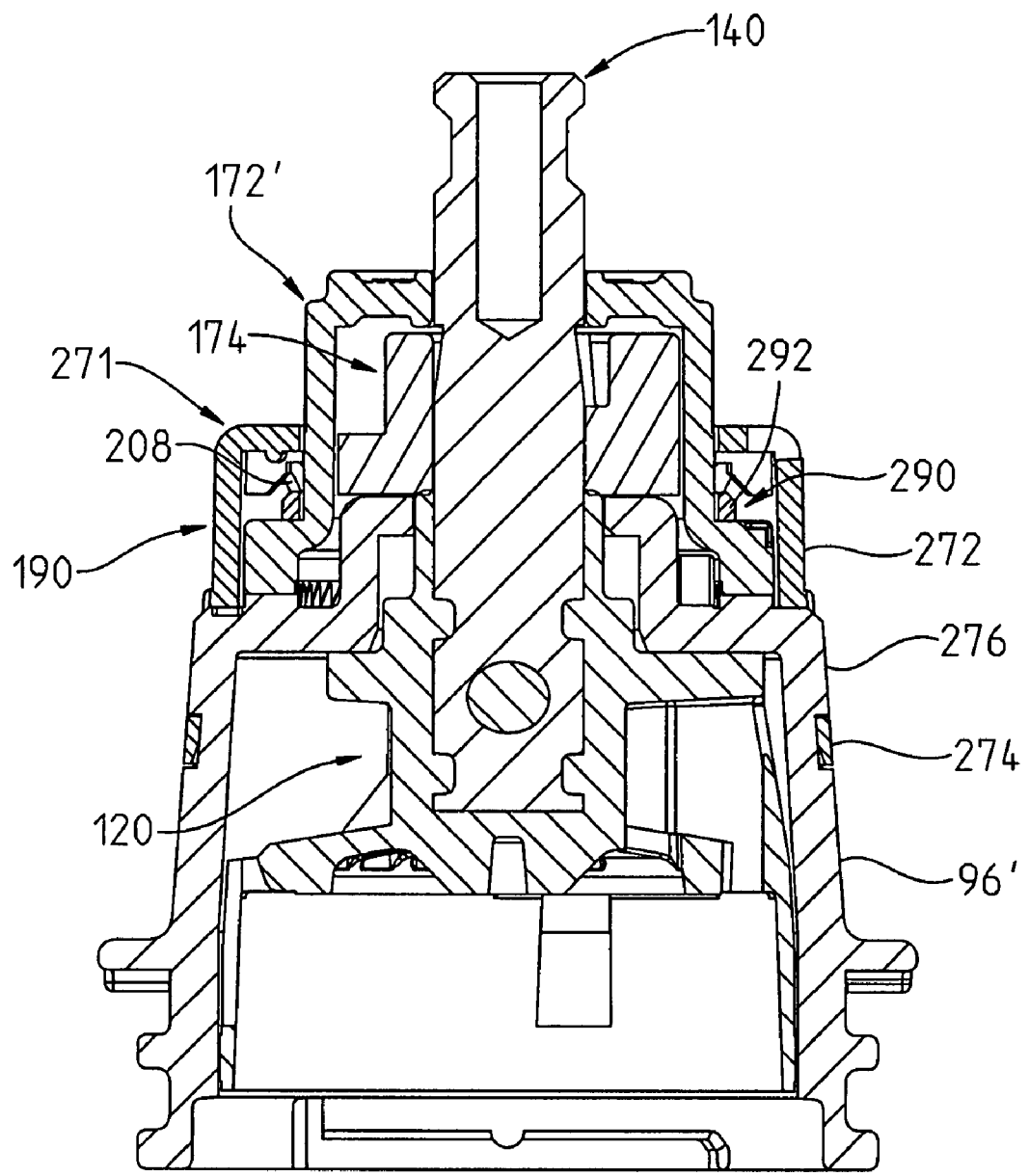
FIG. 17 is a cross-sectional view taken along line 17-17 of FIG. 14.
Figure 18:
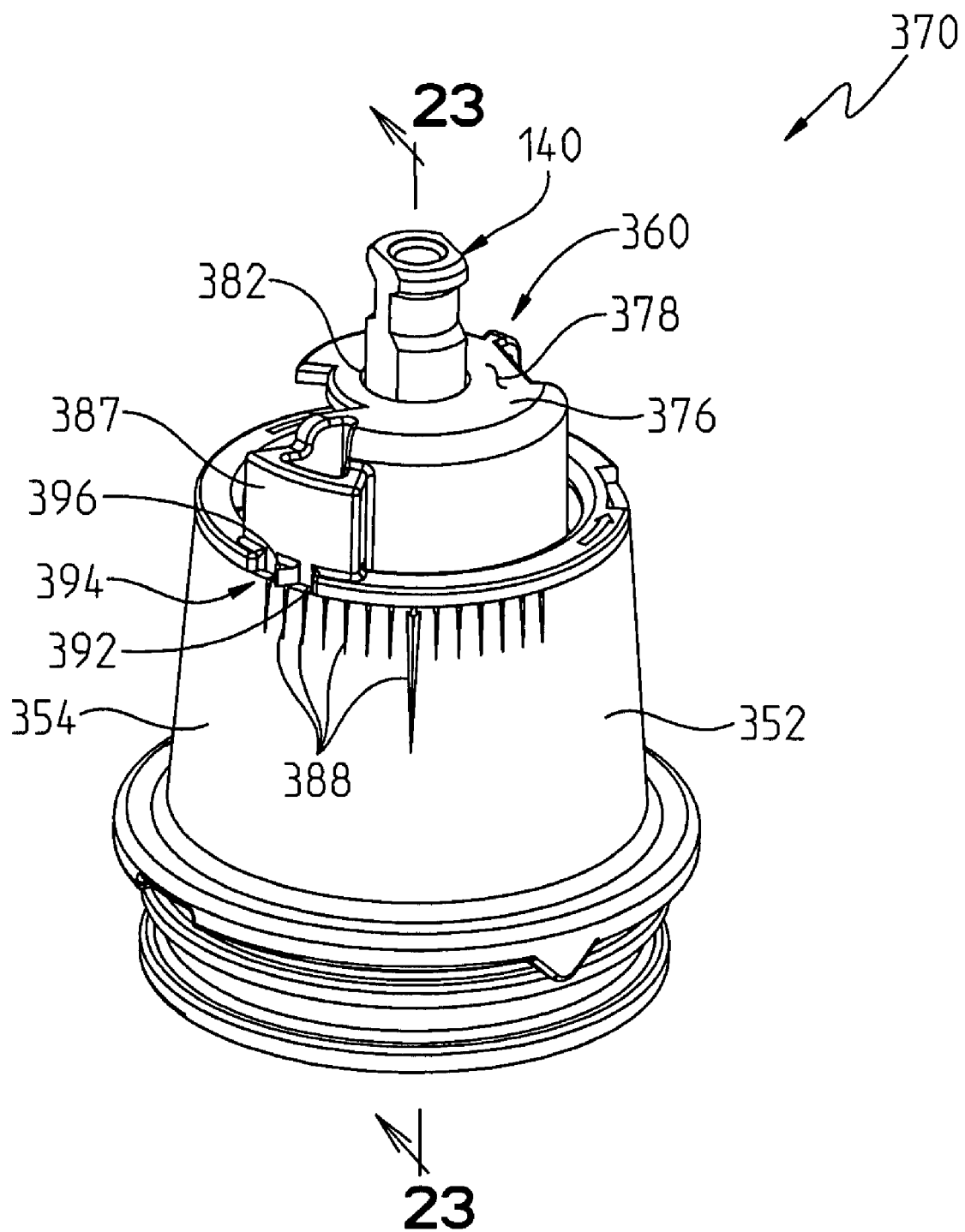
FIG. 18 is a top perspective view of an outer valve assembly including a further illustrative embodiment temperature rotational limit stop assembly.
Figure 19:
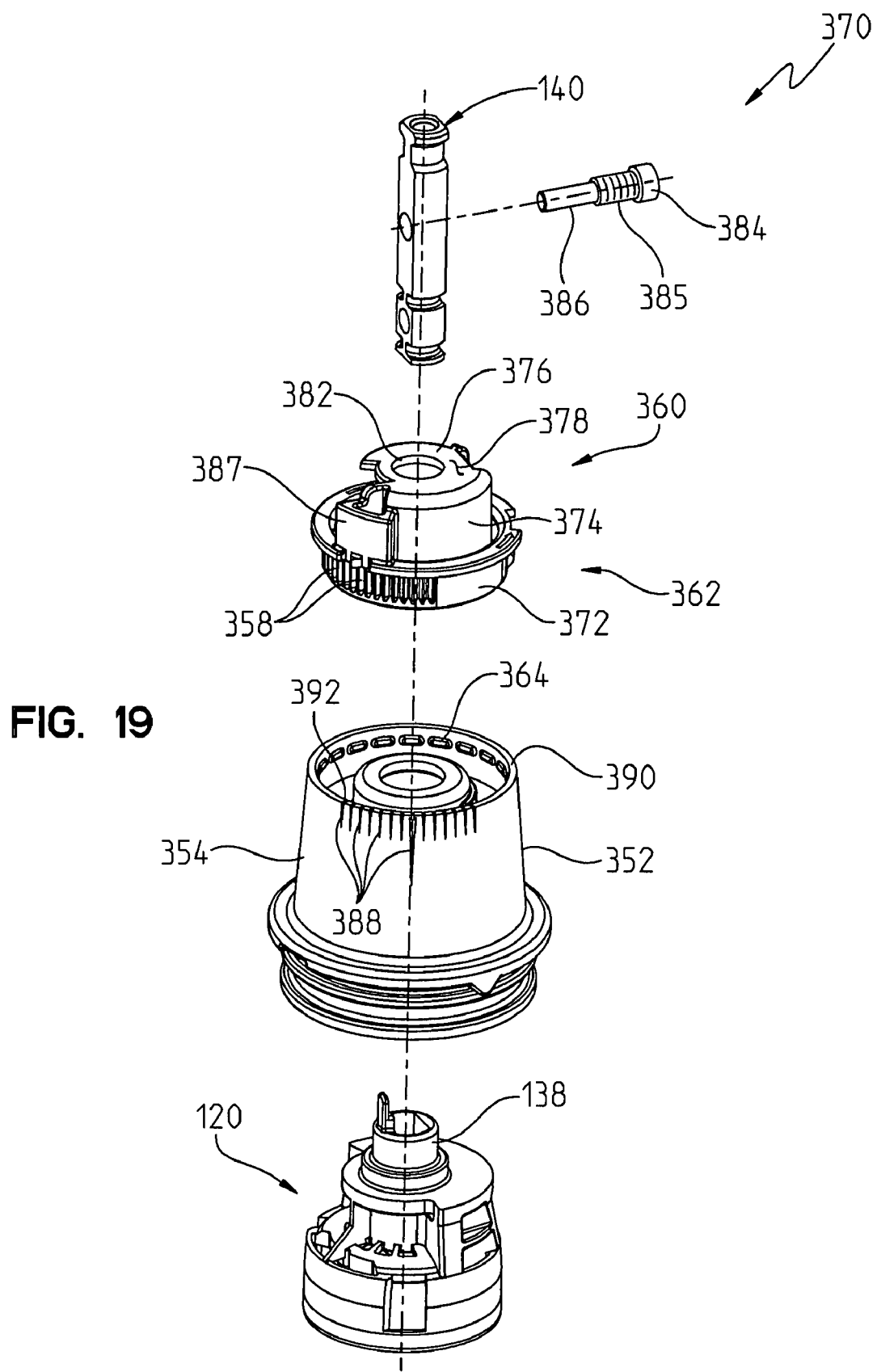
FIG. 19 is an exploded top perspective view of the outer valve assembly of FIG. 18.
Figure 20:
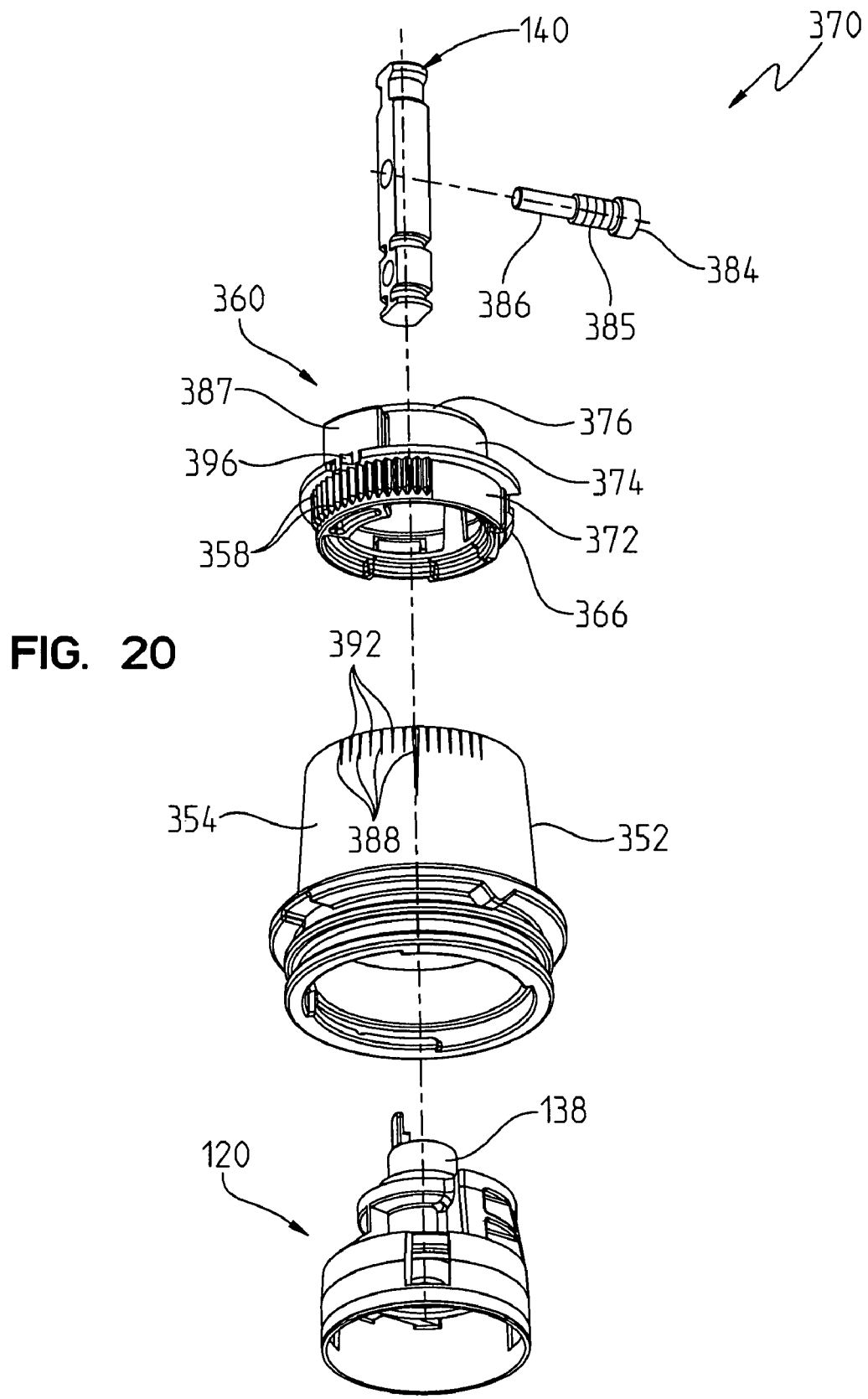
FIG. 20 is a exploded bottom perspective view similar to FIG. 19.

A limit stop lock 290 may be provided to prevent the splines 284 of the limit stop member 172' from unintentionally disengaging from the splines 286 of the cap 96', regardless of dimensional stack up. The limit stop lock 290 illustratively comprises an annular adjuster ring 292, which may be formed of a thermoplastic, having a pair of diametrically opposed finger grips 294, and a pair of diametrically opposed cam locking members 296. The grips 294 extend through slots 302 in the adjuster ring 292 and serve as activation points for the installer. Each cam locking member 296 includes an angled ramp 298 and a small groove 300 that interfaces with a cooperating projection or rib 301 on the retainer housing 272 to lock in place (FIG. 16).

The grips 294 received within slots 302 allow for the locking members 296 to be rotated for activation. The pair of ribs 301 form the main cooperating locking features and are located on the inside of the retainer housing 272. The ribs 301 are supported by chamfers 306 on both sides thereof for defining a lead in angle for cam engagement with the locking members 296.

The limit stop lock 290 fills the gap between the retainer 271 and the stop member 172' when the lock 290 is activated. Once the valve is installed and the installer has set the stop member 172' to the desired temperature setting, biasing arms 208 return the stop member 172' to the correct set position. As one of the last steps in the installation process, the installer activates the lock 290. Slight pressure would then be applied to the finger grips 294 for rotating the lock 290 clockwise until secured. The cam action of the stop locking members 296 and ribs 301 insures the teeth 284 and 286 are engaged properly. Further, such cam action fills the gap between the stop member 172' and the retainer 271, which locks the stop member 172' in position and prevents the teeth 284 and 286 from disengaging. In order to make additional temperature adjustments, the stop lock 290 is unlocked by rotating the finger grips 294 counterclockwise.

With reference now to FIGS. 18-23, a further illustrative embodiment temperature limit stop assembly 370 for use within a mixing valve is shown. The temperature limit stop assembly 370 of FIGS. 18-23 includes several similar features as the temperature limit stop assembly 170 of FIGS. 4-8. As such, similar components are identified with like reference numbers.

Figure 21:
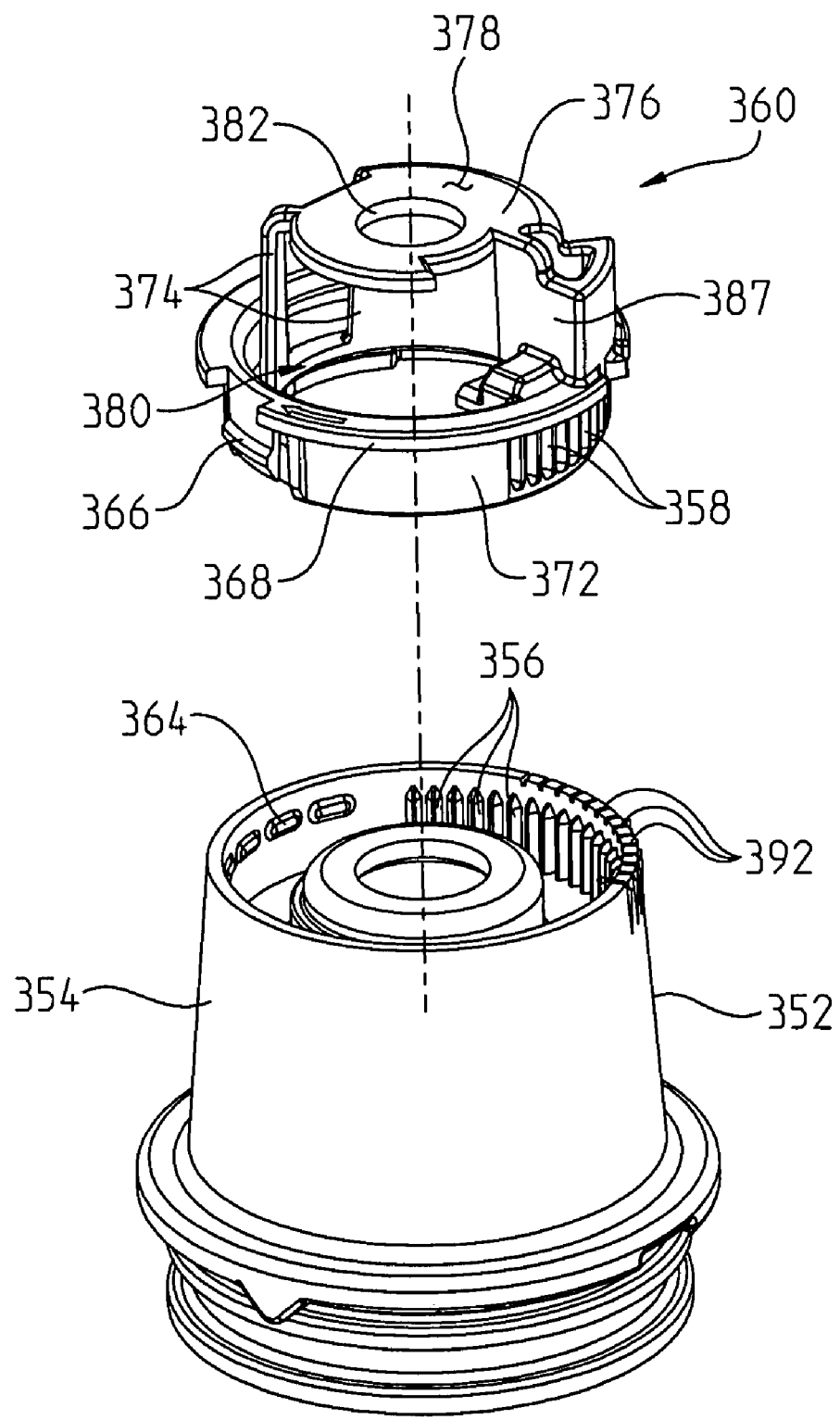
FIG. 21 is a detailed perspective view showing a cap and a cooperating stop member.
Figure 22:
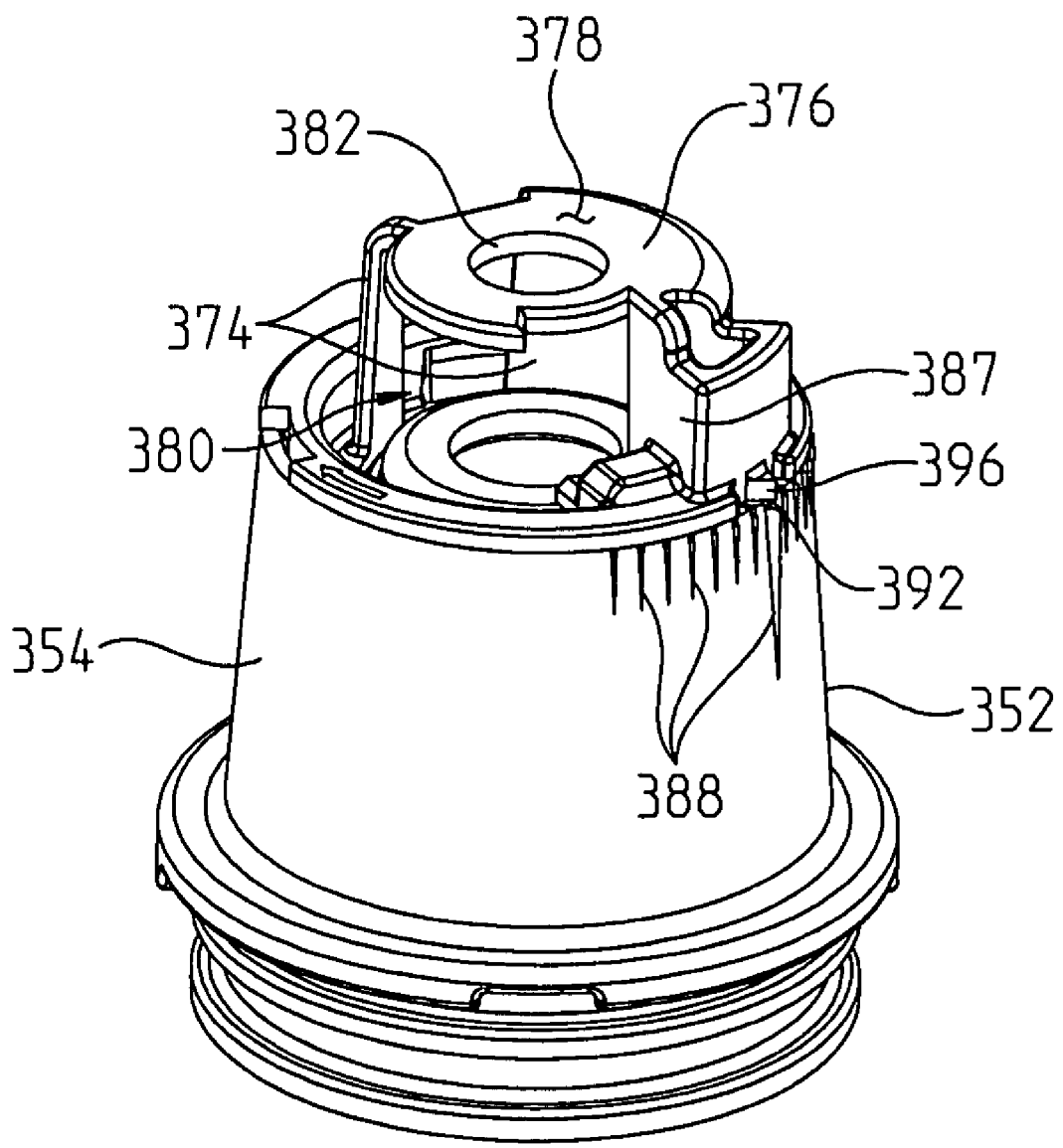
FIG. 22 is a detailed perspective view showing castellations formed within the sidewall of a cap and an indicator supported from a stop member.
Figure 23:
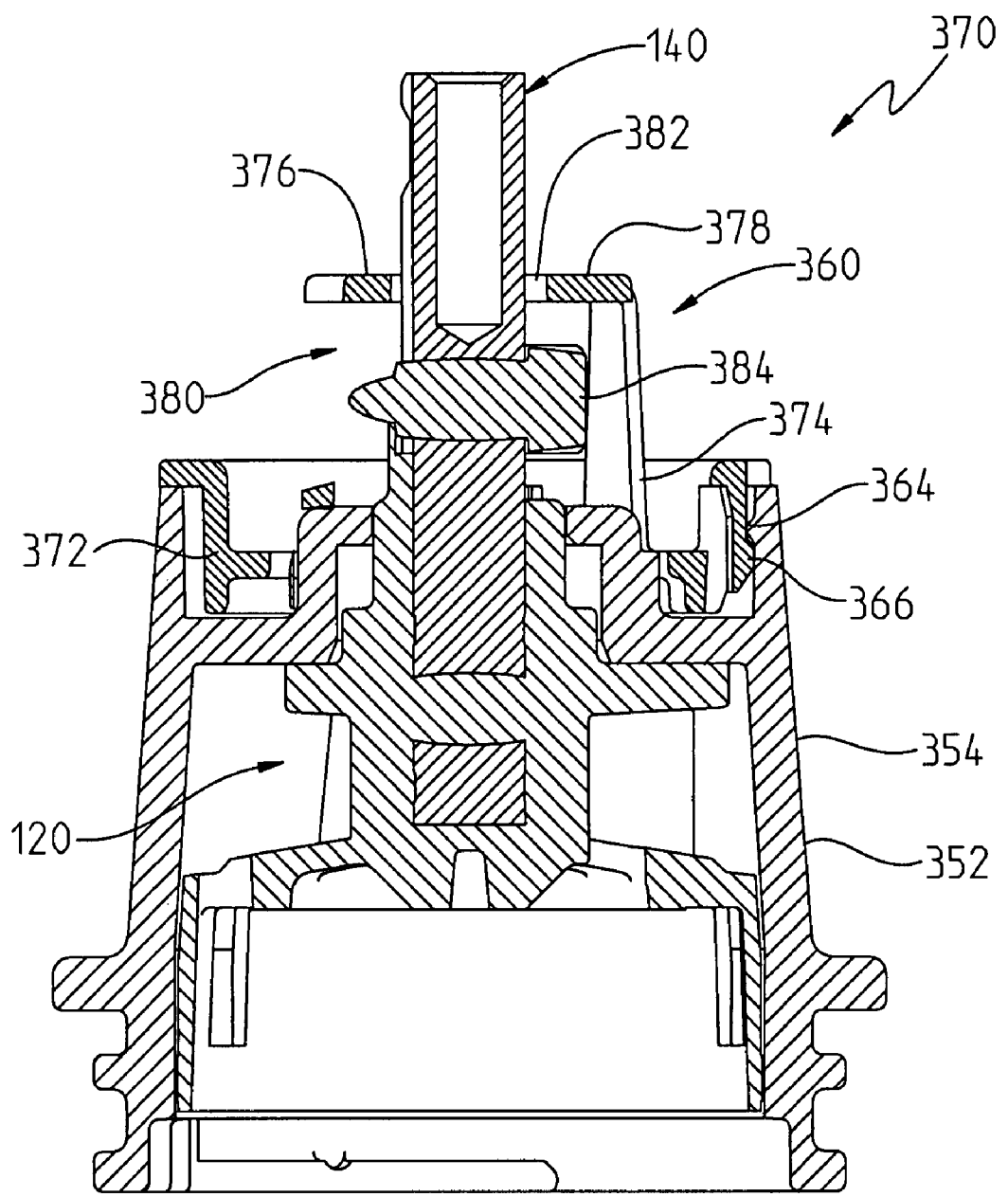
FIG. 23 is a cross-sectional view taken along line 23-23 of FIG. 18.
Figure 24:
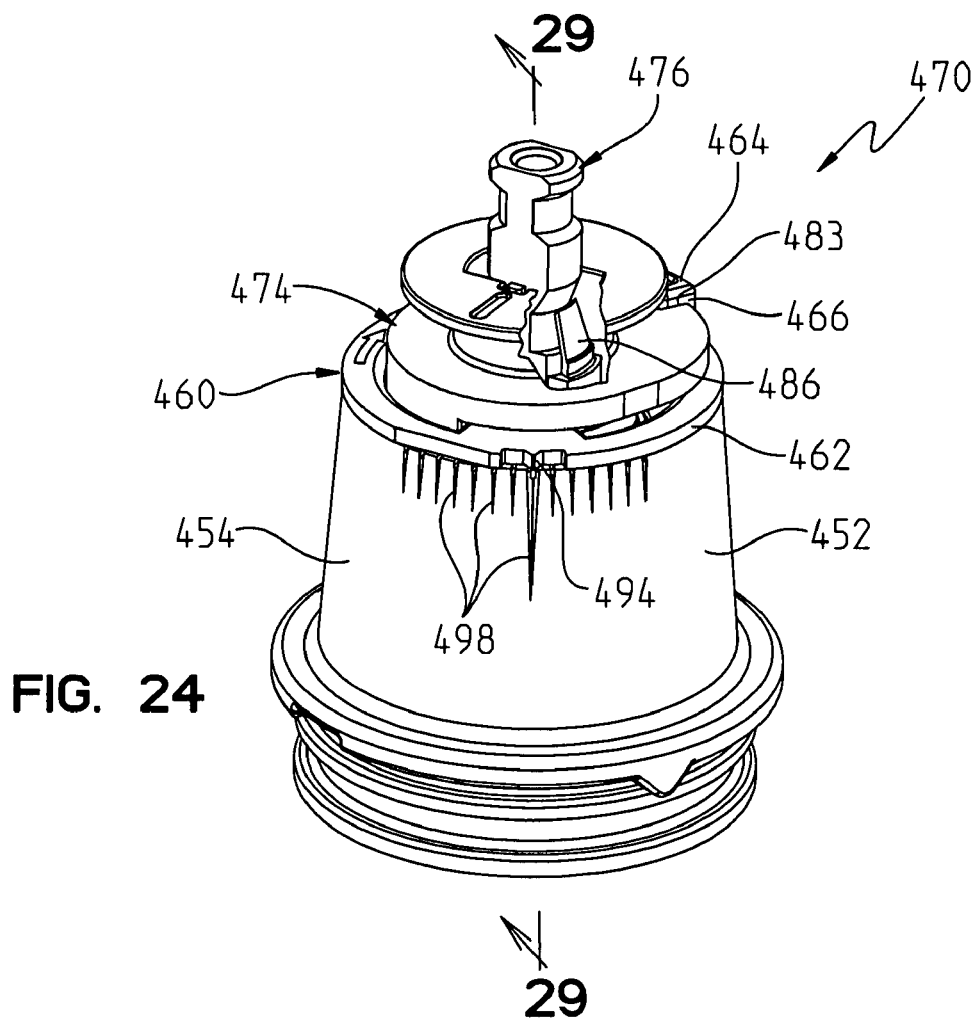
FIG. 24 is a perspective view of an outer valve assembly including a further illustrative embodiment temperature rotational limit stop assembly, with a partial cutaway of the stop actuator.

The temperature limit stop assembly 370 includes a cap 352 having a plurality of radially inwardly extending splines 356 which are configured to cooperate with radially outwardly extending splines 358 of a stop member 360 (FIG. 21). A retainer 362 includes an arcuate retainer ring 364 formed within the cap 352 and extending radially inwardly from the inner surface of the cylindrical wall 354. The retainer ring 364 illustratively extends around a portion of the cylindrical wall 354 opposite splines 356, and may be either continuous or include intermittent gaps. The retainer ring 364 cooperates with a pair of diametrically opposed retainer clips or snaps 366 extending axially inwardly from a flange 368 formed within the stop member 360 (FIG. 21). The clips 366 are positioned internal to the cap 352 in order to prevent damage during removal of the trim sleeve (not shown). The internal clips 366 prevent deformation during adjustment or installation. The clips 366 are provided for retention during shipment and to insure that the stop member 360 stays engaged at a predetermined position during shipping.

The stop member 360 includes an annular adjustment ring 372 supporting the plurality of radially outwardly extending splines 358 configured to be selectively coupled to the cap 352. At least one standoff 374 supports an engagement disk 376 having an engagement surface 378 in axially spaced relation to the adjustment ring 372. The adjustment ring 372 defines a center opening 380 which is coaxially aligned with a center opening 382 formed within the engagement disk 376 for receiving the stem 140.

A stop actuator, illustratively a stop stud 384, is operably coupled to the stem 140 in a conventional manner, such as through threads 385. The stop stud 384 extends transverse to the stem 140 and defines a stop surface 386. In a manner similar to that detailed above, the stop surface 386 is selectively engagable with the stop shoulder 387 of the stop member 360 to limit counterclockwise rotation of the stem 140, and thereby limit the maximum hot water temperature.

Also in a manner similar to that detailed above, the engagement surface 378 of the stop member 360 is configured to cooperate with a mating surface 240 of a handle 114 (FIG. 4). More particularly, the mating surface 240 of the handle 114 essentially encapsulates the stop member 360 between the handle 114 and the housing cap 352. As such, the splines 356 and 358 of the temperature limit stop assembly 370 are placed in full engagement thereby facilitating proper operation of the stop function. More particularly, once the stop member 360 and stop stud 384 are coupled with the stem 140, the limit stop member 360 cannot be removed from the valve assembly without removing the stop stud 384. The limit stop member 360 can be adjusted without removing the stud 384, but is not removable from the assembly 370.

The outer surface of the cap 352 includes a plurality of peripheral indicator marks 388 which are configured to provide a visual indication to the user of the position of the stop shoulder 387 of the stop member 360 relative to the cap 352. An upper edge 390 of the cylindrical wall 354 of the cap 352 includes a plurality of castellations 392 which are axially aligned with the peripheral indicator marks 388. An indicator window 394 is formed within the stop member 360 and an indicator or pointer 396 is received therein for alignment with the castellations 392 and peripheral marks 388. The temperature setting alignment is visible when the valve is installed with the appropriate trim (not shown). This stop member 360 feature is achieved by recessing the alignment indicator 396 inside the outer diameter of the cap 352 and adding the castellations 392 to the top of the cap 352. As such, the limit stop member 360 can be rotationally adjusted with visual reference even if trim pieces or other objects are hiding the peripheral indicator marks 388 of the cap 352. Castellations 392, and corresponding indicator marks 388, are illustratively positioned every six degrees corresponding to a desired range of temperature.

Again, to achieve adjustment of the limit stop shoulder 387, a user axially separates the limit stop member 360 from the cap 352 by disengaging the clips 366 from the retaining ring 364. The user then rotates the stop member 360 clockwise or counterclockwise to a desired setting. The limit stop member 360 is then returned to a set position by applying an axial force such that the clips 366 snap over the retaining ring 364 of the cap 352.

With reference now to FIGS. 24-30, a further illustrative embodiment temperature limit stop assembly 470 for use within a mixing valve is shown as including a stop actuator or disk 474 movable between a first or set position on a valve stem 476 and a second or adjust position on the stem 476. Again, the temperature limit stop assembly 470 of FIGS. 24-30 include several similar features as the temperature limit stop assembly 170 of FIGS. 4-8. As such, similar components are identified with like reference numbers.

Figure 25:
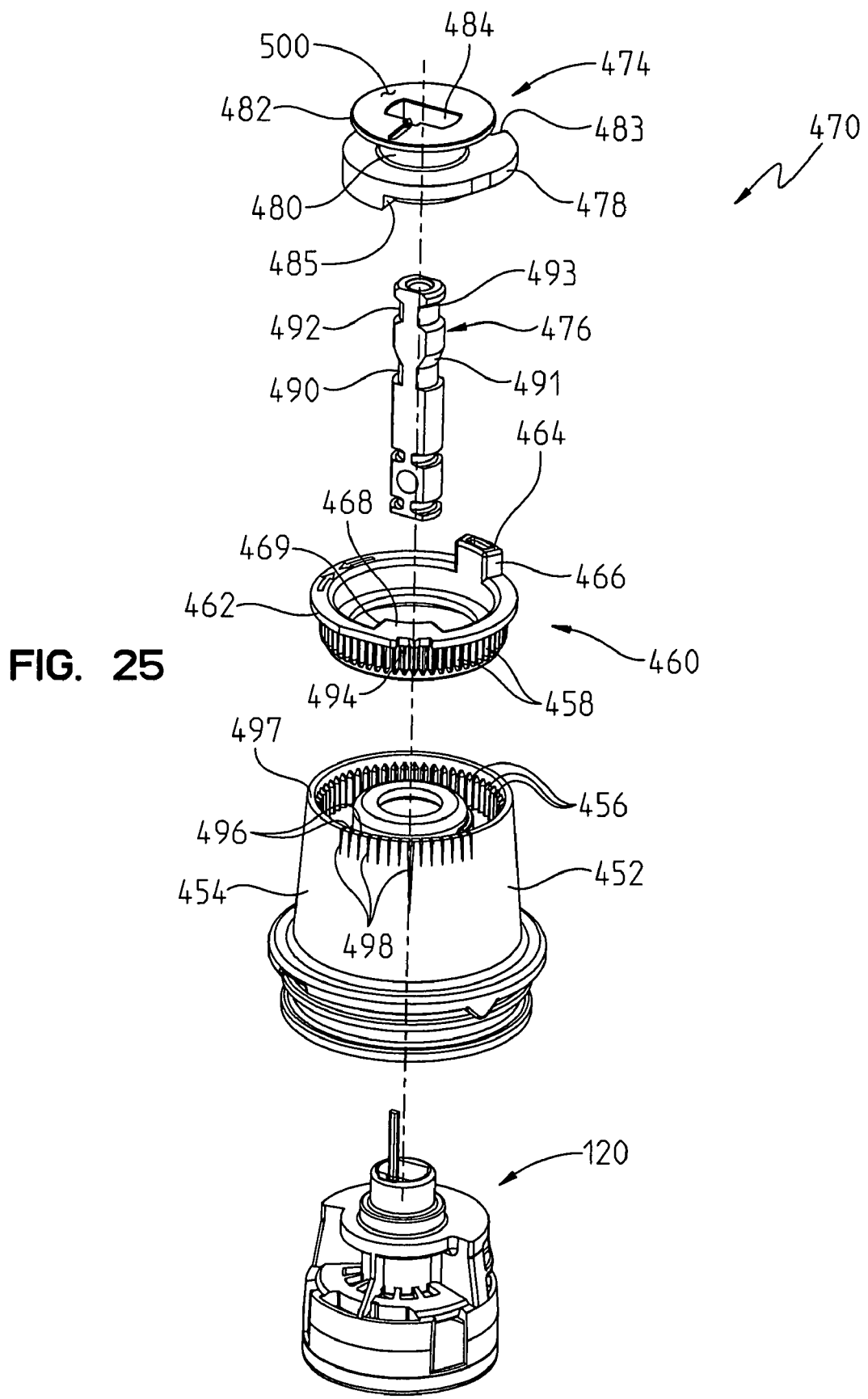
FIG. 25 is an exploded top perspective view of the outer valve assembly of FIG. 24.
Figure 26:
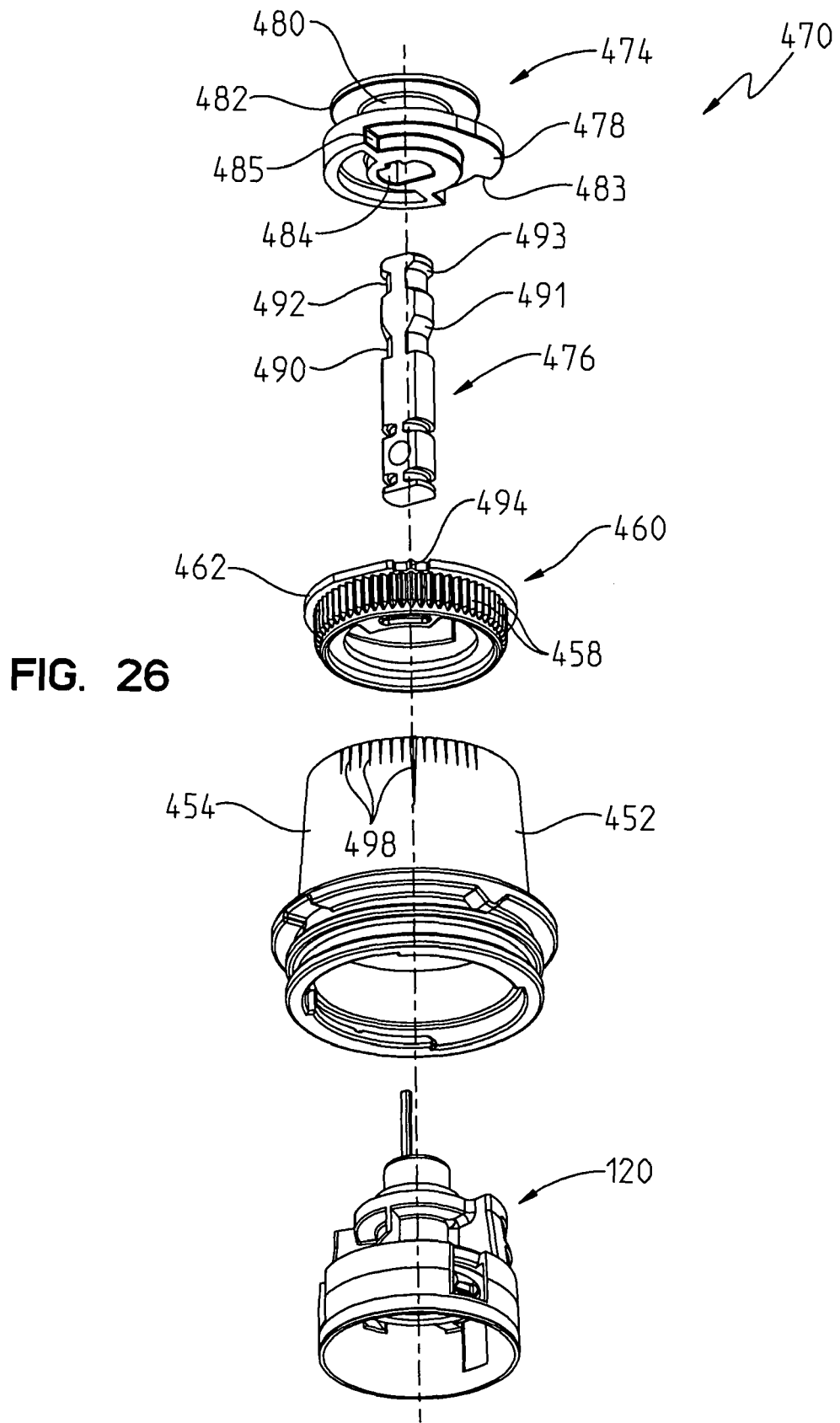
FIG. 26 is an exploded bottom perspective view of the outer valve assembly of FIG. 24.
Figure 28:
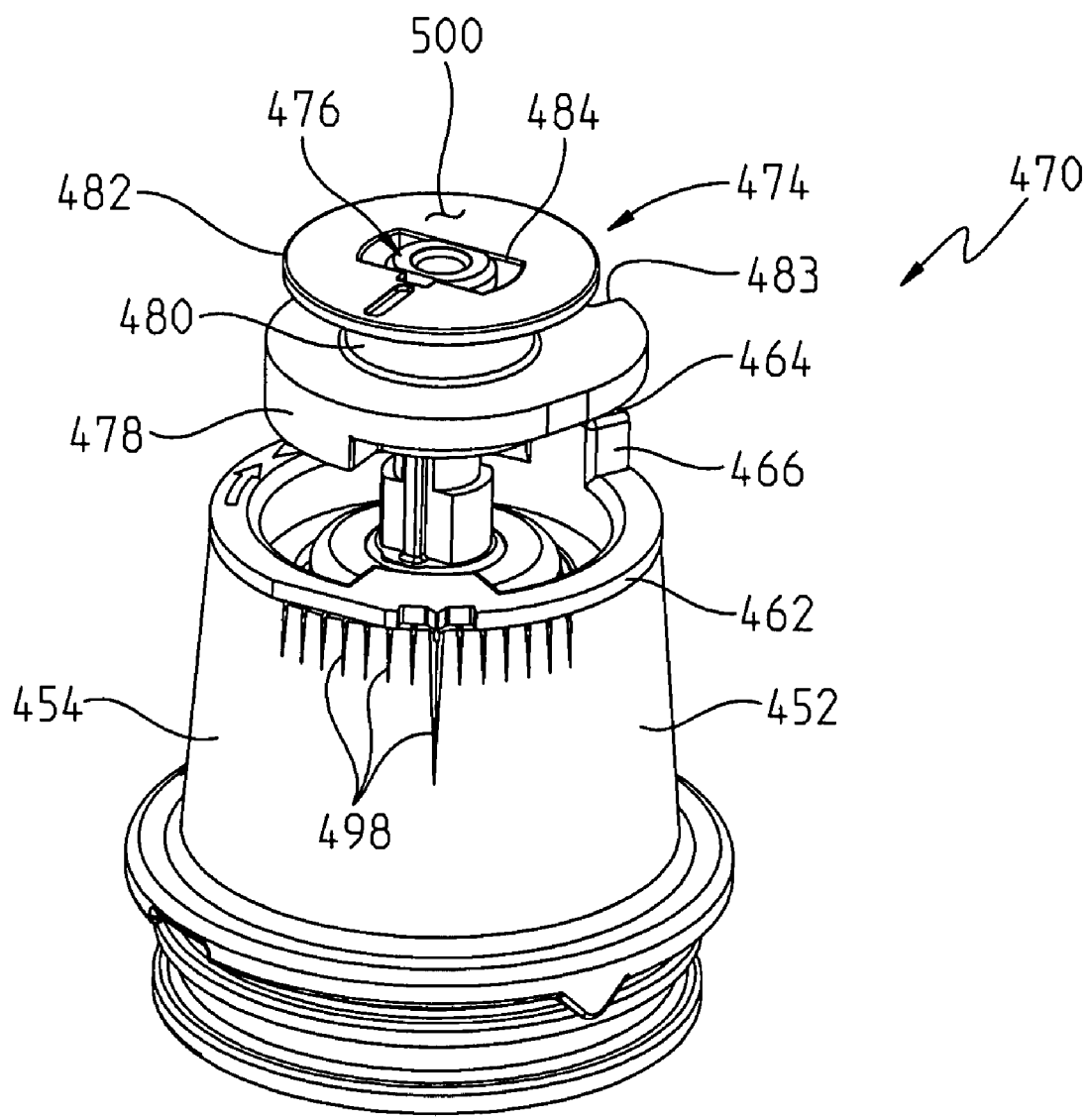
FIG. 28 is a perspective view similar to FIG. 24, showing the actuator in an outer position on the stem.
Figure 29:
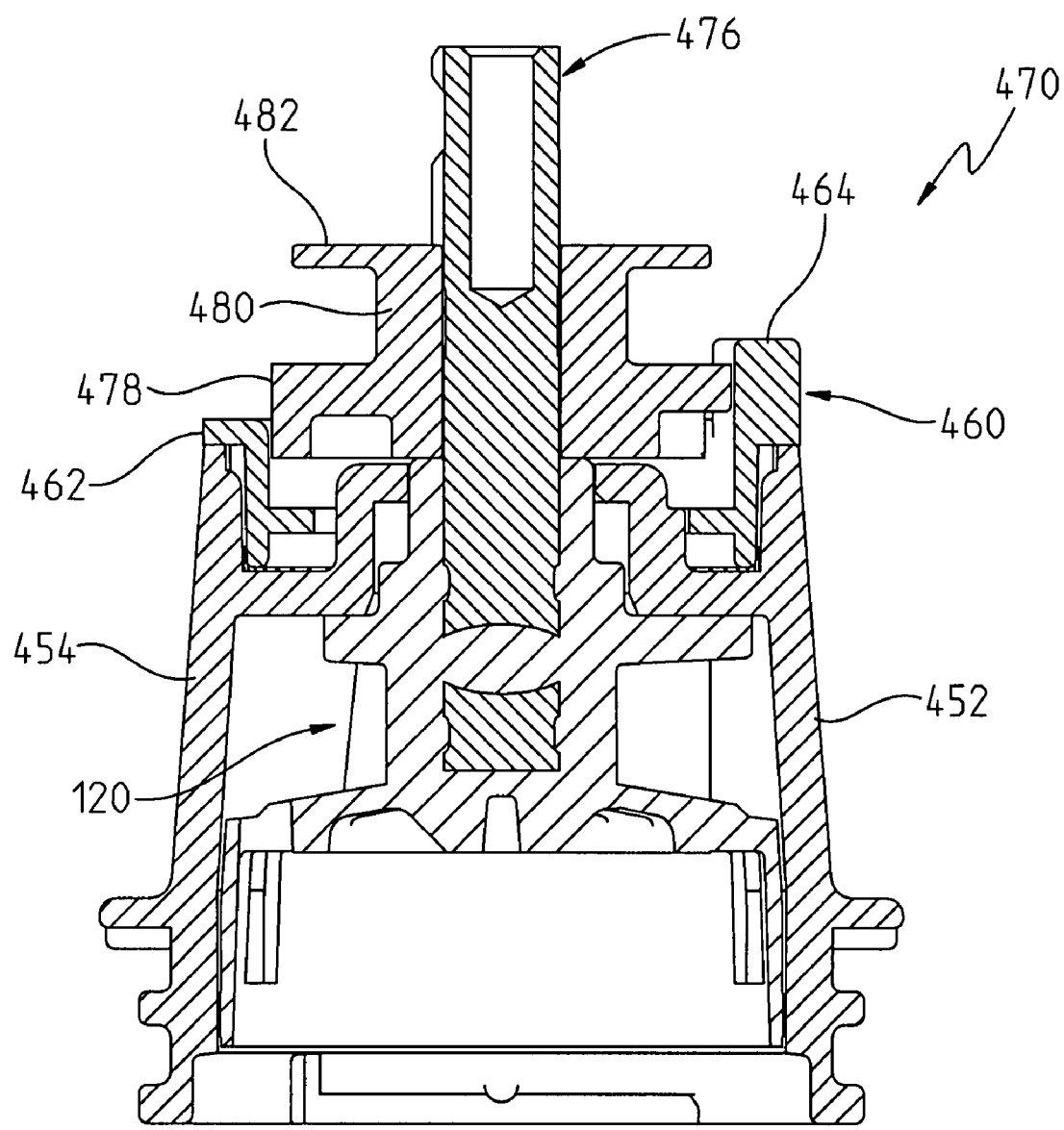
FIG. 29 is a cross-sectional view taken along line 29-29 of FIG. 24.
Figure 30:
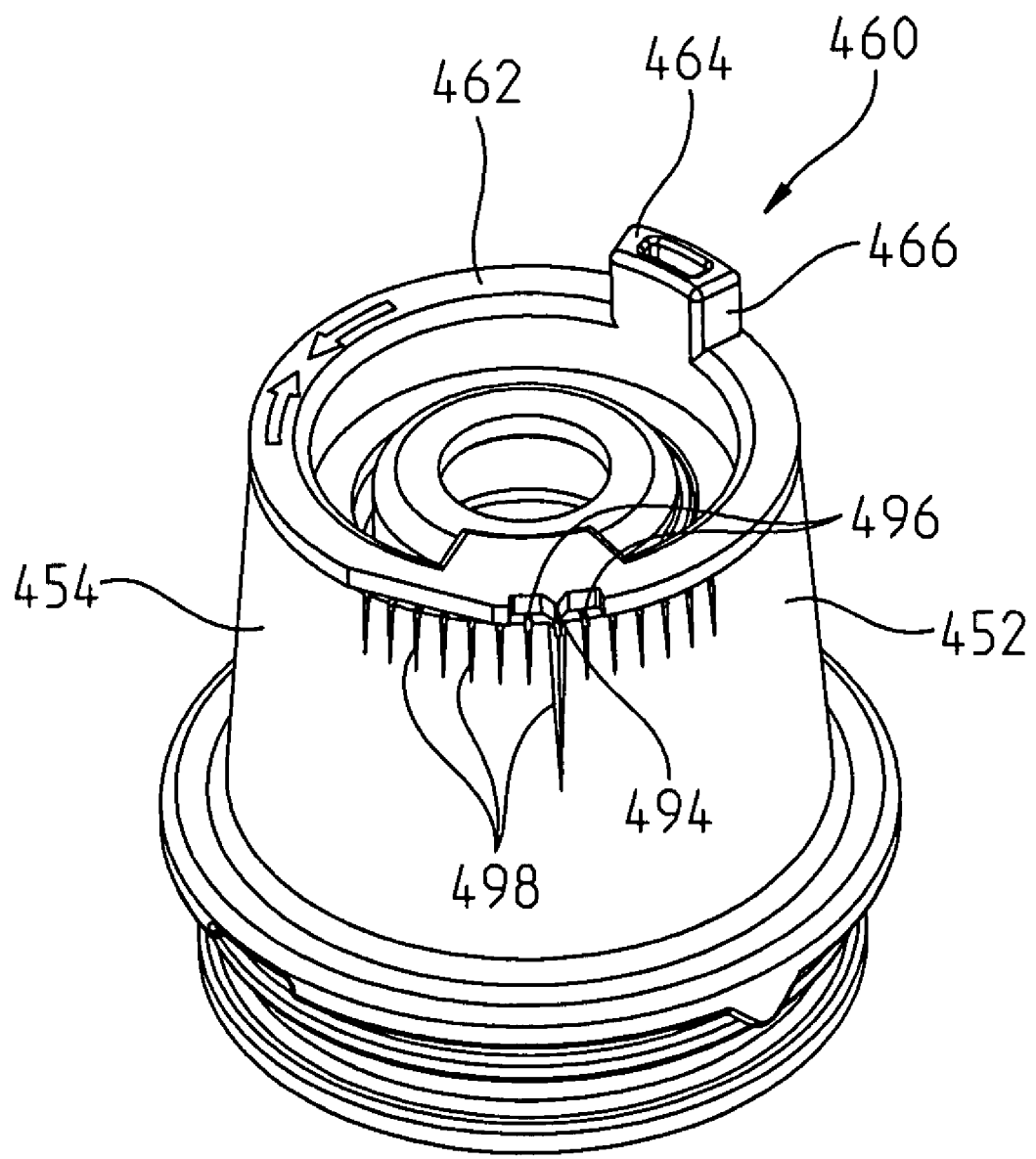
FIG. 30 is a detailed perspective view showing castellations formed within the sidewall of a cap and an indicator supported by a stop member.

The temperature limit stop assembly 470 includes a cap 452 having a cylindrical wall 454 of the cap 452 includes a plurality of radially inwardly extending splines 456 which are configured to cooperate with radially outwardly extending splines 458 of a stop member 460 (FIGS. 25 and 26). The stop member 460 includes an annular adjustment or temperature limit ring 462 supporting the splines 458 for engagement with splines 456 of the cap 452. A first tab 464 extends axially outwardly from the ring 462 and defines a first stop shoulder 466. A second tab 468 extends radially inwardly from the ring 462 and defines a second stop shoulder 469.

Figure 27:
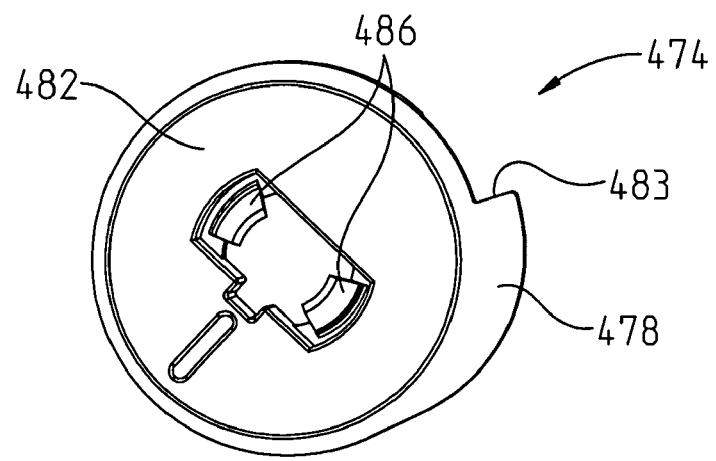
FIG. 27 is a top plan view of the actuator of FIG. 24.

The stop actuator 474 includes an inner member or disk 478 supported by a standoff 480 in axially spaced relation to an outer member or disk 482. The inner member 478 includes first and second stop surfaces 483 and 485 configured to move with the stem 476 and selectively engage the first and second stop shoulders 466 and 469 of the stop member 460, respectively. While two stop surfaces 483 and 485 and cooperating stop shoulders 466 and 469 are illustrated, in order to provide increased contact surface area and reduce stress concentrations, it should be appreciated that any member of stop surfaces and stop shoulders may be provided, including one of each. An opening 484 extends through the actuator 474 and is configured to receive the stem 476. The opening 484 and stem 476 have complementary cross-sectional shapes to prevent relative rotation. Internal resilient snaps or clips 486 are formed within the actuator and extend axially outwardly within opening 484 (FIG. 27). The clips 486 are configured to retain the actuator 474, and hence the stop member 460, to the valve housing during shipping. The clips 486 are positioned so that after final assembly, the clips 486 are internal to the assembly 470 to prevent damage thereto.

A first groove 490 formed on the stem 476 is configured to provide for shipping retention thereby defining a first retained position, while a second groove 492 formed on the stem 476 is configured to provide for pull off prevention thereby defining a second retained position. More particularly, less force is required to slide the actuator 474 axially outwardly from the first groove 490 (i.e., away from the stop member 460) due to ramp surface 491, than is required to remove the actuator 474 from the second groove 492 due to perpendicular surface 493. The retention force of the first groove 490 is configured to be great enough such that the actuator 474 remains positioned in a predetermined setting is kept until it reaches the end user. Once the actuator 474 is pressed onto the stem 476 to the point that the actuator 474 is flush with the end of the stem 476, it snaps into the second groove 492 to prevent pull off. The actuator 474 can then be pressed further on the stem 476 to reach its installed position in the first groove 490, but also be axially outwardly for subsequent adjustment of the stop member 460.

The temperature setting alignment is visible when the assembly 470 is installed with trim pieces (not shown). More particularly, an alignment indicator 494 is recessed inside the outer diameter of the temperature limit ring 462 and is configured to be aligned with castellations 496 formed within an upper edge 497 of wall 454 of the cap 452. The castellations 496 are aligned with corresponding indicator marks 498 on the periphery of the cap 452. The temperature limit ring 462 may be adjusted with visual reference even if trim pieces or other objects are hiding the periphery marks on the cap 452. The castellations 496 are illustratively provided every six degrees, corresponding to a desired range of temperature.

In order to achieve adjustment, a user moves the actuator 474 from the first groove 490 to the second groove 492. As such, the actuator 474 will not interface with rotational adjustment of the stop member 460. Next, the stop member 460 is moved axially to separate the temperature limit ring 462 from the cap 452. The user then rotates the temperature limit ring 462 clockwise or counterclockwise to a desired setting. The temperature limit ring 462 is then seated back to the housing cap 452 such the splines again engage by pushing the actuator 474 back into position.

In a manner similar to that detailed above, an upper engagement surface 500 of the stop actuator 474 is configured to cooperate with a mating surface 240 of a handle 114 (FIG. 4). More particularly, the mating surface 240 of the handle 114 essentially encapsulates the stop member 460 between the handle 114 and the housing cap 452. As such, engagement between the handle 114 and the actuator 474 facilitates engagement between splines 458 and 456 of the stop member 460 and the cap 452, thereby ensuing proper orientation for engagement between the stop surfaces 483 and 485 of the stop actuator 474 and the stop shoulders 466 and 469 of the stop member 460.

Although the invention has been described in detail with reference to certain preferred embodiments, variations and modifications exist within the spirit and scope of the invention as described and defined in the following claims.

The invention claimed is:

1. A mixing valve comprising:
 a housing including an outlet port, a cold water supply port, and a hot water supply port;
 a cap supported by the housing and including a plurality of splines;
 a valve plate including a first control opening in selective fluid communication with the cold water supply port, and a second control opening in selective fluid communication with the hot water supply port, the valve plate being supported for rotation relative to the cap;
 a stem operably coupled to the valve plate, wherein rotation of the stem causes rotation of the valve plate and simultaneous movement of the first control opening and the second control opening to determine the amount of fluid communication with the cold water supply port and the hot water supply port for controlling the flow rate and the temperature of water provided to the outlet port;
 a stop surface supported by the stem;
 a stop member including a plurality of splines configured to selectively engage the plurality of splines of the cap, a hot water stop shoulder engagable with the stop surface of the stem to limit rotational movement of the valve plate, and an engagement surface extending substantially perpendicular to the stem;
 a handle including a retaining surface, the handle operably coupled to the stem such that the retaining surface is engagable with the engagement surface of the stop member to restrict axial movement thereof;
 a retainer coupled to the cap and configured to cooperate with the stop member to limit axial movement of the stop member relative to the cap in the absence of the handle, while permitting selective rotational movement of the stop member relative to the cap; and
 wherein the stop member has a set mode of operation where the splines of the stop member engage with the splines of the cap, and an adjustment mode of operation where the stop member is axially displaced outwardly away from the cap such that the splines of the stop member are disengaged from the splines of the cap while the retainer retains the stop member to the cap.

2. The mixing valve of claim 1, wherein the cap includes a cylindrical sidewall, the splines of the cap extending radially inwardly from the sidewall, and the stop member includes a base, the splines of the stop member extending radially outwardly from the base.

3. The mixing valve of claim 1, further comprising a limit stop disk supporting the stop surface and including an opening to receive the stem.

4. The mixing valve of claim 1, wherein the retainer comprises an annular housing having a center opening receiving the stop member for selective axial and rotational movement therebetween, and a plurality of resilient arms engaging the stop member.

5. The mixing valve of claim 1, wherein the retainer comprises an annular housing having a center opening receiving the stop member, the annular housing including an indicator window, and the stop member including a base having a plurality of indicia visible through the indicator window.

6. The mixing valve of claim 1, wherein the stop surface is defined by a stop stud extending transverse to the stem.

7. The mixing valve of claim 1, wherein the stop member includes an7 annular adjustment ring operably coupled to the cap, and a standoff supporting the engagement surface in axially spaced relation to the adjustment ring.

8. A mixing valve comprising:
 a housing including an outlet port, a cold water supply port, and a hot water supply port;
 a cap supported by the housing;
 a valve plate including a first control opening in selective fluid communication with the cold water supply port, and a second control opening in selective fluid communication with the hot water supply port, the valve plate being supported for rotation relative to the cap;
 a stem operably coupled to the valve plate, wherein rotation of the stem causes rotation of the valve plate and simultaneous movement of the first control opening and the second control opening to determine the amount of fluid communication with the cold water supply port and the hot water supply port for controlling the flow rate and the temperature of water provided to the outlet port;
 a stop surface supported by the stem;
 a stop member including a hot water stop shoulder engagable with the stop surface of the stem to limit rotational movement of the valve plate, and an engagement surface extending substantially perpendicular to the stem;
 a handle including a retaining surface, the handle operably coupled to the stem such that the retaining surface is engagable with the engagement surface of the stop member to restrict axial movement thereof;
 a retainer coupled to the cap and configured to cooperate with the stop member to limit axial movement of the stop member relative to the cap in the absence of the handle, while permitting selective rotational movement of the stop member relative to the cap; and
 wherein the retainer comprises an annular housing having a center opening receiving the stop member for selective axial and rotational movement therebetween, and a plurality of resilient arms engaging the stop member.

9. The mixing valve of claim 8, wherein:
 the cap includes a plurality of splines; and
 the stop member includes a plurality of splines configured to selectively engage the plurality of splines of the cap.

10. The mixing valve of claim 8, wherein the cap includes a cylindrical sidewall, the splines of the cap extending radially inwardly from the sidewall, and the stop member includes a base, the splines of the stop member extending radially outwardly from the base.

11. The mixing valve of claim 8, further comprising a limit stop disk supporting the stop surface and including an opening to receive the stem.

12. The mixing valve of claim 8, wherein the retainer comprises an annular housing having a center opening receiving the stop member, the annular housing including an indicator window, and the stop member including a base having a plurality of indicia visible through the indicator window.

13. The mixing valve of claim 8, wherein the stop surface is defined by a stop stud extending transverse to the stem.

14. The mixing valve of claim 8, wherein the stop member includes an annular adjustment ring operably coupled to the cap, and a standoff supporting the engagement surface in axially spaced relation to the adjustment ring.

15. A mixing valve comprising:
 a housing including an outlet port, a cold water supply port, and a hot water supply port;
 a cap supported by the housing;
 a valve plate including a first control opening in selective fluid communication with the cold water supply port, and a second control opening in selective fluid communication with the hot water supply port, the valve plate being supported for rotation relative to the cap;

a stem operably coupled to the valve plate, wherein rotation of the stem causes rotation of the valve plate and simultaneous movement of the first control opening and the second control opening to determine the amount of fluid communication with the cold water supply port and the hot water supply port for controlling the flow rate and the temperature of water provided to the outlet port;

a stop surface supported by the stem;

a stop member including, a hot water stop shoulder engagable with the stop surface of the stem to limit rotational movement of the valve plate, and an engagement surface extending substantially perpendicular to the stem;

a handle including a retaining surface, the handle operably coupled to the stem such that the retaining surface is engagable with the engagement surface of the stop member to restrict axial movement thereof;

a retainer coupled to the cap and configured to cooperate with the stop member to limit axial movement of the stop member relative to the cap in the absence of the handle, while permitting selective rotational movement of the stop member relative to the cap; and wherein the retainer comprises an annular housing having a center opening receiving the stop member, the annular housing including an indicator window, and the stop member including a base having a plurality of indicia visible through the indicator window.

16. The mixing valve of claim 15, wherein:
the cap includes a plurality of splines; and
the stop member includes a plurality of splines configured to selectively engage the plurality of splines of the cap.

17. The mixing valve of claim 15, wherein the cap includes a cylindrical sidewall, the splines of the cap extending radially inwardly from the sidewall, and the stop member includes a base, the splines of the stop member extending radially outwardly from the base.

18. The mixing valve of claim 15, further comprising a limit stop disk supporting the stop surface and including an opening to receive the stem.

19. The mixing valve of claim 15, wherein the retainer comprises an annular housing having a center opening receiving the stop member for selective axial and rotational movement therebetween, and a plurality of resilient arms engaging the stop member.

20. The mixing valve of claim 15, wherein the stop surface is defined by a stop stud extending transverse to the stem.

21. The mixing valve of claim 15, wherein the stop member includes an annular adjustment ring operably coupled to the cap, and a standoff supporting the engagement surface in axially spaced relation to the adjustment ring.

* * * * *